United States Patent
Nagai

(10) Patent No.: US 11,982,551 B2
(45) Date of Patent: May 14, 2024

(54) ENCODER USING ROTATABLE PLATE, LIGHT SOURCE AND LIGHT RECEIVER

(71) Applicant: Panasonic Intellectual Property Management Co., Ltd., Osaka (JP)

(72) Inventor: Shuichi Nagai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/100,387

(22) Filed: Jan. 23, 2023

(65) Prior Publication Data
US 2023/0160725 A1    May 25, 2023

Related U.S. Application Data

(63) Continuation of application No. PCT/JP2021/029083, filed on Aug. 5, 2021.

(30) Foreign Application Priority Data

Aug. 25, 2020 (JP) ................. 2020-142141

(51) Int. Cl.
*G01D 5/347* (2006.01)
*G01D 5/30* (2006.01)

(52) U.S. Cl.
CPC ........... *G01D 5/34776* (2013.01); *G01D 5/30* (2013.01); *G01D 5/34715* (2013.01); *G01D 2218/00* (2021.05)

(58) Field of Classification Search
CPC .......... G01D 5/34776; G01D 5/3473
See application file for complete search history.

(56) References Cited

U.S. PATENT DOCUMENTS 10,088,341 B2    10/2018   Kato
10,119,842 B1 *  11/2018   Grossman .......... G01D 5/34746
(Continued)

FOREIGN PATENT DOCUMENTS

JP    H01-318920 A   12/1989
JP    H04-131713 A    5/1992
(Continued)

OTHER PUBLICATIONS

International Search Report dated Oct. 26, 2021 in International Patent Application No. PCT/JP2021/029083, with English translation.

*Primary Examiner* — Tony Ko
(74) *Attorney, Agent, or Firm* — Rimon P.C.

(57) ABSTRACT

An encoder includes rotatable plate including first and second patterns, light emission unit, and light receiving unit. The first pattern includes first and second unit regions. The first unit regions guide the light from light emission unit to the light receiving unit. The second unit regions are configured not to guide light from the light emission unit to the light receiving unit. The second pattern includes first and second unit regions. The first unit regions of the second pattern guide light from light emission unit to the light receiving unit. The second unit regions of the second pattern are configured not to guide light from the light emission unit to the light receiving unit. The first and second unit regions of the first pattern are reverse to the first and second unit regions of the second pattern in a direction perpendicular to a rotation direction of the rotatable plate.

13 Claims, 15 Drawing Sheets

(56) References Cited

U.S. PATENT DOCUMENTS

| 10,907,995 | B2 | 2/2021 | Kato |
| 11,002,562 | B2 | 5/2021 | Wang et al. |
| 2016/0178407 | A1 | 6/2016 | Yoshida et al. |

FOREIGN PATENT DOCUMENTS

| JP | 2016-118486 A | 6/2016 |
| JP | 2020-034541 A | 3/2020 |

\* cited by examiner

| | Values for forming 3rd Arrangement | | Values for forming 1st Arrangement | | | | | | | Values for forming 2nd Arrangement | | | |
|---|---|---|---|---|---|---|---|---|---|---|---|---|---|
| Output from | | 90 | 92 | 94 | 96 | 98 | 100 | 102 | 104 | 106 | 110 | | |
| Output Value | 0 | 0 | 1 | 0 | 1 | 0 | 1 | 0 | 1 | 1 | 0 | 0 | 0 | 0 |
| | 0 | 1 | 0 | 1 | 0 | 1 | 0 | 1 | 1 | 0 | 0 | 0 | 0 | 1 |
| | 1 | 0 | 1 | 0 | 1 | 0 | 1 | 1 | 0 | 0 | 0 | 0 | 1 | 1 |

US 11,982,551 B2

ENCODER USING ROTATABLE PLATE, LIGHT SOURCE AND LIGHT RECEIVER

CROSS-REFERENCE OF RELATED APPLICATIONS

This application is a continuation application of International Patent Application No. PCT/JP2021/029083, filed on Aug. 5, 2021, which in turn claims the benefit of Japanese Patent Application No. 2020-142141, filed on Aug. 25, 2020, the entire disclosures of which Applications are incorporated by reference herein.

TECHNICAL FIELD

The present disclosure relates to an encoder.

BACKGROUND ART

An encoder for detecting rotation of a rotation shaft of a motor is known. For example, PTL 1 discloses an encoder including a pattern arranged in a measurement direction, a light source configured to emit light to the pattern, and light reception elements arranged in the measurement direction and configured to receive the light emitted from the light source and transmitted through or reflected by the pattern.

CITATION LIST

Patent Literature

PTL 1: Japanese Patent Laid-Open Publication No. 2016-118486

SUMMARY OF INVENTION

An encoder according to an aspect of the present disclosure includes a rotatable plate including a first pattern and a second pattern, a light emission unit configured to emit light to the first pattern and the second pattern, and a light receiving unit configured to receive light emitted from the light emission unit and passing through the first pattern and light emitted from the light emission unit and passing through the second pattern. Each of the first pattern and the second pattern includes first unit regions and second unit regions which are arranged in a circumferential direction about a rotation axis of the rotatable plate. The first unit regions are configured to guide the light emitted from the light emission unit to the light receiving unit. The second unit regions are configured not to guide the light emitted from the light emission unit to the light receiving unit. An order of the first unit regions and the second unit regions are arranged in the first pattern are reversed to an order of the first unit regions and the second unit regions of the second pattern.

An encoder according to another aspect of the present disclosure includes a rotatable plate including a pattern, a light emission unit configured to emit light to the pattern, and a light receiving unit configured to receive light emitted from the light emission unit and passing through the pattern. The pattern includes first unit regions and second unit regions arranged in a circumferential direction about a rotation axis of the rotatable plate. The first unit regions are configured to guide the light emitted from the light emission unit to the light receiving unit. The second unit regions are configured not to guide the light emitted from the light emission unit to the light receiving unit. When the first unit regions and the second unit regions are referred to as unit regions, the pattern includes: a first arrangement that is an arrangement of M unit regions for outputting position information indicating a position of a detection target; and a second arrangement that is an arrangement of N unit regions for outputting correction information for correcting the position information, the second arrangement being adjacent to the first arrangement.

According to the present disclosure, it is possible to provide an encoder capable of preventing a decrease in detection accuracy.

BRIEF DESCRIPTION OF DRAWINGS

FIG. 8 is a diagram illustrating a table illustrating values obtained by the calculation circuit shown in FIG. 7.

FIG. 15 is a diagram illustrating a table illustrating values obtained by the calculation circuit shown in FIG. 14.

DESCRIPTION OF EMBODIMENTS

Figure 1:
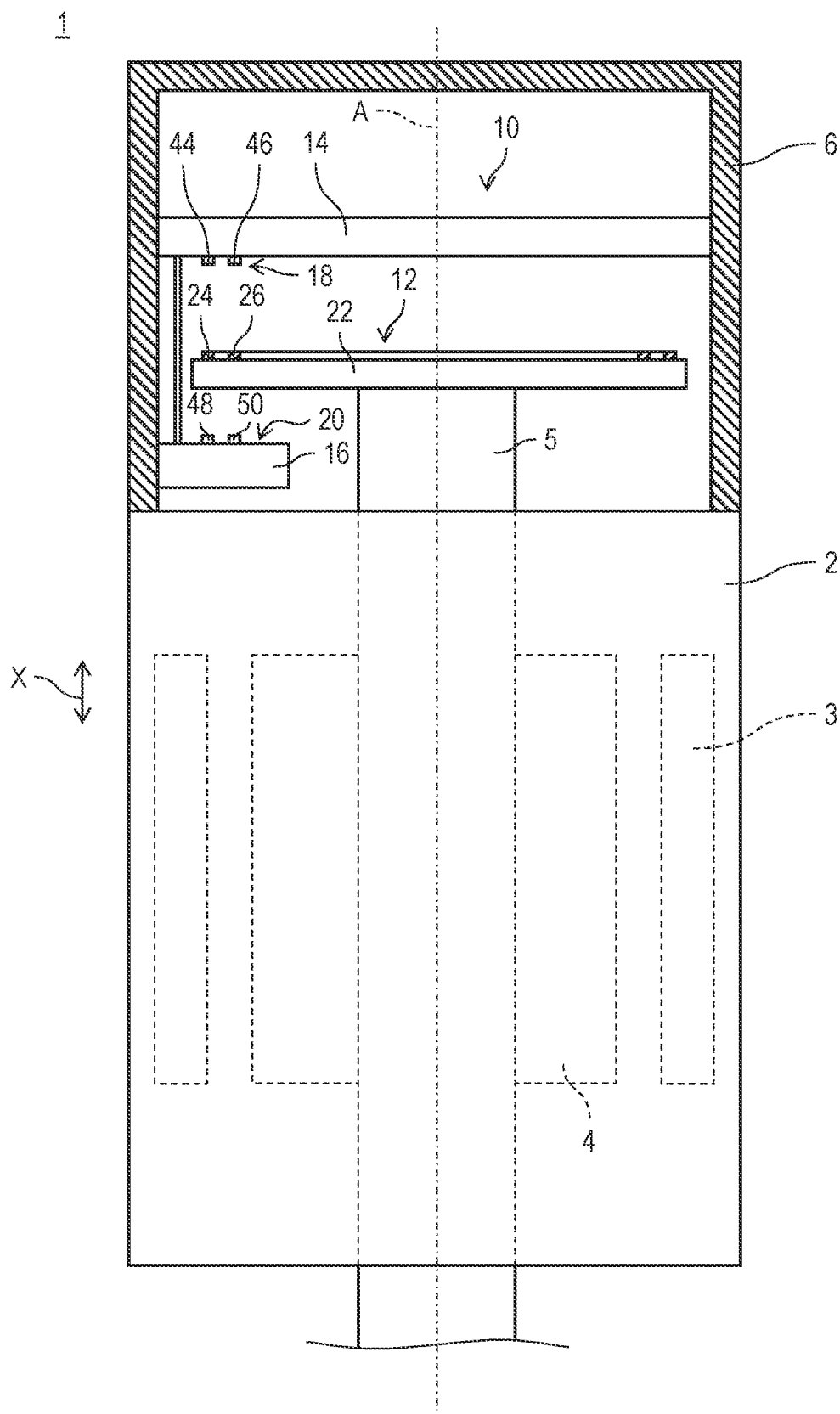
FIG. 1 is a diagram illustrating a motor including an encoder according to an exemplary embodiment.

Hereinafter, an embodiment of the present disclosure will be described. The embodiment described below illustrates a specific example of the present disclosure. Therefore, numerical values, constituent elements, arrangement positions and connection forms of the constituent elements, processes, an order of the processes, and the like described in the following embodiment are examples, and are not intended to limit the present disclosure. Accordingly, among the constituent elements in the following embodiment, constituent elements not recited in any one of the independent claims defining the broadest concept of the present disclosure are described as any constituent elements.

In addition, each drawing is a schematic diagram and is not necessarily a precise illustration. In each drawing, substantially the same components are denoted by the same reference numerals, and redundant descriptions will be omitted or simplified.

Exemplary Embodiment

Figure 2A:
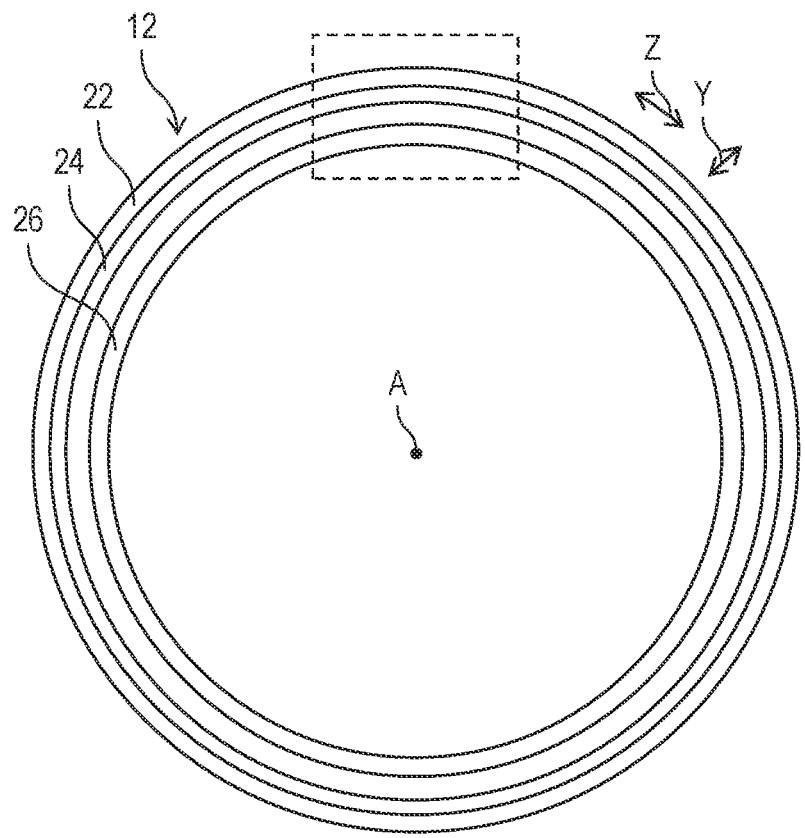
FIG. 2A is a diagram illustrating a rotatable plate of the encoder shown in FIG. 1.
Figure 2B:
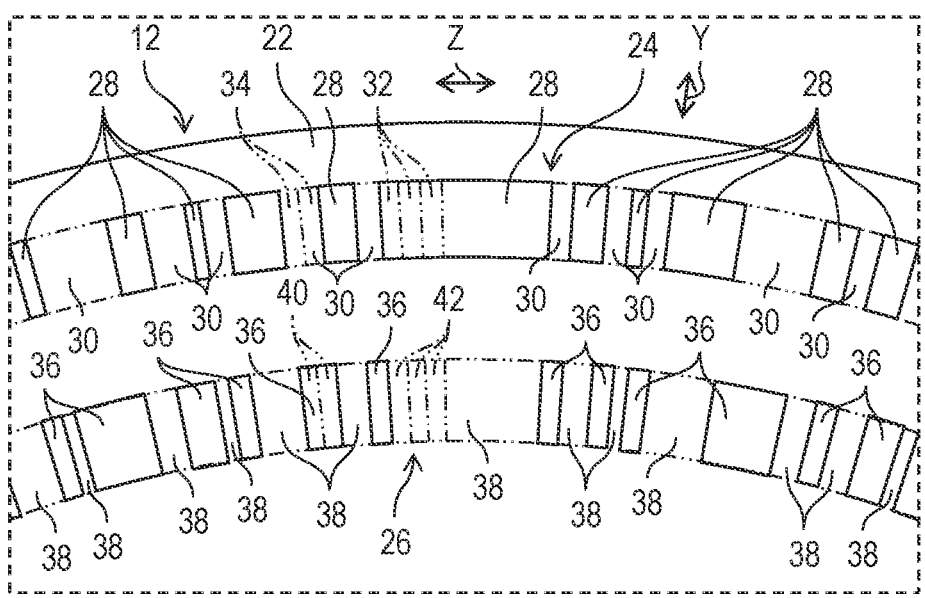
FIG. 2B is a diagram illustrating the rotatable plate of the encoder shown in FIG. 1.

FIG. 1 is a diagram illustrating motor 1 including encoder 10 according to an exemplary embodiment. FIG. 2A and FIG. 2B are diagrams illustrating rotatable plate 12 of encoder 10 shown in FIG. 1. FIG. 2A is rotatable plate 12 viewed in an axial direction, and FIG. 2B is an enlarged view of rotatable plate 12 for illustrating a portion surrounded by a dotted line shown in FIG. 2A. In FIG. 1, case 6, first pattern 24, and second pattern 26 are illustrated in across-sectional view. In the following description, the axial direction is a direction in which a rotation axis A extends (see an arrow X in FIG. 1). A radial direction indicates a radial direction about the rotation axis A (see an arrow Y in FIG. 2A and FIG. 2B). A circumferential direction is a circumferential direction about the rotation axis A and surrounds the rotation axis A (see an arrow Z in FIG. 2A and FIG. 2B). The radial direction is perpendicular to the circumferential direction and the rotation axis. A configuration of encoder 10 will be described with reference to FIG. 1, FIG. 2A, and FIG. 2B.

As illustrated in FIG. 1, motor 1 includes main body 2, stator 3, rotor 4, rotation shaft 5, case 6, and encoder 10.

Main body 2 is a housing that accommodates stator 3, rotor 4, and the like. Stator 3 is fixed to an inner surface of main body 2. Rotor 4 is rotatable with respect to stator 3.

Rotation shaft 5 has a rod shape, such as a cylindrical shape, is fixed to an inner surface of rotor 4, and is configured to rotate about the rotation axis A. For example, when power is supplied to motor 1, rotation shaft 5 rotates about the rotation axis A together with rotor 4 based on the power. Encoder 10 is provided at one end of rotation shaft 5 in the axial direction. A load (not illustrated) or the like that is rotationally driven by the rotation of rotation shaft 5 is attached to the other end of rotation shaft 5 in the axial direction. Rotation shaft 5 is made of, e.g., magnetic metal, such as iron.

Case 6 is attached to main body 2 and covers the one end of rotation shaft 5 in the axial direction, encoder 10, and the like. Case 6 is made of, e.g., magnetic metal, such as iron.

Encoder 10 is configured to detect rotation of a detection target. Specifically, encoder 10 is configured to detect a position (a rotation position) of the detection target, a rotation direction of the detection target, a rotation speed of the detection target, and the like. In this embodiment, the detection target is rotation shaft 5. That is, encoder 10 is configured to detect a position of rotation shaft 5, a rotation direction of rotation shaft 5, a rotation speed of rotation shaft 5, and the like.

As described above, encoder 10 is provided at the one end of rotation shaft 5 in the axial direction. As illustrated in FIG. 1, FIG. 2A, and FIG. 2B, encoder 10 includes rotatable plate 12, first substrate 14, second substrate 16, light emission unit 18, and light receiving unit 20.

Rotatable plate 12 is configured to rotate about the rotation axis A, and includes main body 22, first pattern 24, and second pattern 26.

Main body 22 has a plate shape extending in directions perpendicular to the axial direction, and has a circular shape when viewed in the axial direction. Main body 22 is attached to the one end of rotation shaft 5 in the axial direction, and is configured to rotate about the rotation axis A together with rotation shaft 5. An axial center of main body 22 coincide with the rotation axis A. Main body 22 is made of, e.g., transparent glass, configured to transmit light.

First pattern 24 is provided on a main surface of main body 22 directed to a first substrate 14. First pattern 24 has an annular shape extending along the circumferential direction. First pattern 24 is configured to rotate together with main body 22. In this embodiment, first pattern 24 is an absolute pattern. First pattern 24 includes plural first light-guidable portions 28 and plural first non-light-guidable portions 30.

First light-guidable portions 28 are arranged at intervals in the circumferential direction. Each of first light-guidable portions 28 is constituted by arranging, in the circumferential direction, first unit regions 32 configured to guide light emitted from light emission unit 18 to light receiving unit 20. That is, each of the first light-guidable portions 28 is a region constituted by one or more first unit regions 32, and guides the light emitted from light emission unit 18 to light receiving unit 20. First unit region 32 is a region having a predetermined size. First unit region 32 is made of, e.g., transparent glass, which transmits light.

The number of first unit regions 32 constituting each of the first light-guidable portions 28 is not uniform. A dimension of each of first light-guidable portions 28 in the circumferential direction is determined by the number of first unit regions 32 constituting first light-guidable portion 28, and the dimensions of the first light-guidable portions 28 in the circumferential direction are not necessarily identical to one another. In FIG. 2B, only a part of first unit regions 32 are illustrated in order to avoid complication of the drawing (see a two-dot chain line).

The first non-light-guidable portions 30 are arranged at intervals in the circumferential direction. Specifically, each of the first non-light-guidable portions 30 is arranged between adjacent first light-guidable portions 28 among the plural first light-guidable portions 28. That is, first pattern 24 has a configuration in which first light-guidable portions 28 and first non-light-guidable portions 30 are alternately arranged in the circumferential direction. Each of the first non-light-guidable portions 30 is constituted by arranging, in the circumferential direction, second unit regions 34 which do not guide the light emitted from light emission unit 18 to light receiving unit 20. That is, each of the first non-light-guidable portions 30 is a region constituted by one or more second unit regions 34. When the light is emitted from light emission unit 18, first non-light-guidable portion 30 does not transmit the light and does not guide the light to light receiving unit 20. Second unit region 34 is a region having a predetermined size. Ehen the light is emitted from light emission unit 18, second unit region 34 does not transmit the light and does not guide the light to light receiving unit 20. The size of second unit region 34 is the same as the size of first unit region 32. For example, second unit region 34 is formed by black chromium plating or the like that does not transmit light.

The number of second unit regions 34 constituting each of the first non-light-guidable portions 30 is not uniform. A dimension of each of the first non-light-guidable portions 30 in the circumferential direction is determined by the number of second unit regions 34 constituting first non-light-guidable portion 30, and the dimensions of the first non-lightguidable portions 30 in the circumferential direction are not necessarily identical to one another. In FIG. 2B, only a part of second unit regions 34 are illustrated in order to avoid complication of the drawing (see a two-dot chain line).

As described above, each of the first light-guidable portions 28 is constituted by arranging one or more first unit regions 32 in the circumferential direction, and each of the first non-light-guidable portions 30 is constituted by arranging one or more second unit regions 34 in the circumferential direction. That is, first pattern 24 has a configuration in which first unit regions 32 and second unit regions 34 are arranged in the circumferential direction.

Second pattern 26 is provided on the main surface of main body 22 directed to the first substrate 14. Second pattern 26 is disposed radially inward of first pattern 24 and has an annular shape extending along the circumferential direction. Second pattern 26 rotates together with main body 22. In this embodiment, second pattern 26 is an absolute pattern. Second pattern 26 includes plural second light-guidable portions 36 and plural second non-light-guidable portions 38.

The second light-guidable portions 36 are arranged at intervals in the circumferential direction. Each of the second light-guidable portions 36 is constituted by arranging, in the circumferential direction, first unit regions 40 configured to guide the light emitted from light emission unit 18 to light receiving unit 20. That is, each of the second light-guidable portions 36 is a region constituted by one or more first unit regions 40, and configured to guide the light emitted from light emission unit 18 to light receiving unit 20. First unit region 40 is a region having a predetermined size. When the light is emitted from light emission unit 18, first unit region 40 transmits the light and guides the light to light receiving unit 20. The size of first unit region 40 in second pattern 26 is different from the size of first unit region 32 in first pattern 24. For example, first unit region 40 is formed of transparent glass or the like that transmits light.

The number of first unit regions 40 constituting each of the second light-guidable portions 36 is not uniform. A dimension of each of the second light-guidable portions 36 in the circumferential direction is determined by the number of first unit regions 40 constituting second light-guidable portion 36, and the dimensions of the second light-guidable portions 36 in the circumferential direction are not identical to one another. In FIG. 2B, only a part of first unit regions 40 are illustrated in order to avoid complication of the drawing (see a two-dot chain line).

Each of the plural second light-guidable portions 36 correspond to respective one of the plural first non-light-guidable portions 30. In this embodiment, each of the second light-guidable portions 36 is adjacent in the radial direction to corresponding one of first non-light-guidable portion 30 among the first non-light-guidable portions 30. The number of first unit regions 40 constituting second light-guidable portion 36 is the same as the number of second unit regions 34 constituting first non-light-guidable portion 30 corresponding to second light-guidable portion 36.

That is, each of the first unit regions 40 in second pattern 26 corresponds to respective one of the second unit regions 34 in first pattern 24. In this embodiment, each of the first unit regions 40 in second pattern 26 is adjacent in the radial direction to corresponding second unit region 34 among the second unit regions 34 in first pattern 24.

The second non-light-guidable portions 38 are arranged at intervals in the circumferential direction. Specifically, each of the second non-light-guidable portions 38 is arranged between adjacent second light-guidable portions 36 among the plural second light-guidable portions 36. That is, second pattern 26 has a configuration in which second light-guidable portions 36 and second non-light-guidable portions 38 are alternately arranged in the circumferential direction. Each of the second non-light-guidable portions 38 is constituted by arranging, in the circumferential direction, second unit regions 42 which do not guide the light emitted from light emission unit 18 to light receiving unit 20. That is, each of the second non-light-guidable portions 38 is a region constituted by one or more second unit regions 42. When the light is emitted from light emission unit 18, each of the second non-light-guidable portions 38 does not transmit the light and does not guide the light to light receiving unit 20. Second unit region 42 is a region having a predetermined size. When the light is emitted from light emission unit 18, second unit region 42 does not transmit the light and does not guide the light to light receiving unit 20. The size of second unit region 42 is the same as the size of first unit region 40. In addition, the size of second unit region 42 in second pattern 26 is different from the size of second unit region 34 in first pattern 24. For example, second unit region 42 is formed by black chromium plating or the like that does not transmit light.

The number of second unit regions 42 constituting each of the second non-light-guidable portions 38 is not uniform. A dimension of each of the second non-light-guidable portions 38 in the circumferential direction is determined by the number of second unit regions 42 constituting second non-light-guidable portion 38, and the dimensions of the plurality of second non-light-guidable portions 38 in the circumferential direction are not identical to one another. In FIG. 2B, only a part of second unit regions 42 are illustrated in order to avoid complication of the drawing (see a two-dot chain line).

Each of the second non-light-guidable portions 38 corresponds to respective one of the first light-guidable portions 28. In this embodiment, each of the second non-light-guidable portions 38 is adjacent in the radial direction to corresponding first light-guidable portion 28 among the first light-guidable portions 28. The number of second unit regions 42 constituting second non-light-guidable portion 38 is the same as the number of first unit regions 32 constituting first light-guidable portion 28 corresponding to second non-light-guidable portion 38.

That is, each of the second unit regions 42 in second pattern 26 corresponds to respective one of the first unit regions 32 in first pattern 24. In this embodiment, each of the second unit regions 42 in second pattern 26 is adjacent in the radial direction to corresponding first unit region 32 among the first unit regions 32 in first pattern 24.

As described above, each of the second light-guidable portions 36 is constituted by arranging one or more first unit regions 40 in the circumferential direction, and each of the second non-light-guidable portions 38 is constituted by arranging one or more second unit regions 42 in the circumferential direction. That is, second pattern 26 has a configuration in which first unit regions 40 and second unit regions 42 are arranged in the circumferential direction.

Each of the first unit regions 40 in second pattern 26 corresponds to respective one of the second unit regions 34 in first pattern 24. Each of the second unit regions 42 in second pattern 26 corresponds to respective one of the first unit regions 32 in first pattern 24. An order in which first unit regions 32 and second unit regions 34 are arranged in first pattern 24 is reversed to an order in which first unit regions 40 and second unit regions 42 are arranged in second pattern 26. First unit region 32 and second unit region 34 in first pattern 24 are reversed to first unit region 40 and second unit region 42 in second pattern 26 in a direction (radial direction, the arrow Y) perpendicular to a rotation direction of rotatable plate 12 (an arrow B). That is, first unit region 32 in first pattern 24 and second unit region 42 in second pattern 26 are arranged in the radial direction, and second unit region 34 in first pattern 24 and first unit region 40 in second pattern 26 are arranged in another radial direction.

When the light is emitted to first unit region 32 from light emission unit 18, second pattern 26 allows the light to be also emitted to second unit region 42 corresponding to first unit region 32 from light emission unit 18. When the light is emitted to second unit region 34 from light emission unit 18, second pattern 26 allows the light to be also emitted to first unit region 40 corresponding to second unit region 34 from light emission unit 18. Second pattern 26 reverses an output value of first light receiving element 48 and an output value of second light receiving element 50 to each other. That is, second pattern 26 allows the output value of second light receiving element 50 to be a value reversed to the output value of first light receiving element 48.

As illustrated in FIG. 1, first substrate 14 extends in directions perpendicular to the axial direction. First substrate 14 is spaced apart from rotatable plate 12 in the axial direction, and faces rotatable plate 12. First substrate 14 is fixed at an inner surface of case 6 and does not rotate together with rotation shaft 5.

Second substrate 16 extends in directions perpendicular to the axial direction. Second substrate 16 is spaced apart from rotatable plate 12 in the axial direction, and faces rotatable plate 12. Second substrate 16 is provided on a side opposite to first substrate 14 with respect to rotatable plate 12. Second substrate 16 is fixed at the inner surface of case 6 and does not rotate together with rotation shaft 5.

Light emission unit 18 includes first light emitter 44 and second light emitter 46, and emits light to first pattern 24 and second pattern 26.

First light emitter 44 is attached to first substrate 14 to face first pattern 24 in the axial direction, and emits light to first pattern 24. For example, first light emitter 44 is implemented by a light emitting module or the like.

Second light emitter 46 is attached to first substrate 14 to face second pattern 26 in the axial direction, and emits light to second pattern 26. For example, second light emitter 46 is implemented by a light emitting module or the like.

Light receiving unit 20 is configured to receive light emitted from light emission unit 18 to first pattern 24 and passing through first pattern 24, and to receive light emitted from light emission unit 18 to second pattern 26 and passing through second pattern 26. Light receiving unit 20 includes first light receiving element 48 and second light receiving element 50.

First light receiving element 48 is attached to second substrate 16 to face first pattern 24 in the axial direction, and is configured to receive the light transmitted through first pattern 24. In addition, first light receiving element 48 binarizes an intensity of the received light and outputs the binarized intensity. For example, first light receiving element 48 is implemented by a light reception element or the like.

Second light receiving element 50 is attached to second substrate 16 to face second pattern 26 in the axial direction, and is configured to receive the light transmitted through second pattern 26. In addition, second light receiving element 50 binarizes an intensity of the received light and outputs the binarized intensity. For example, second light receiving element 50 is implemented by a light reception element or the like.

Figure 3:
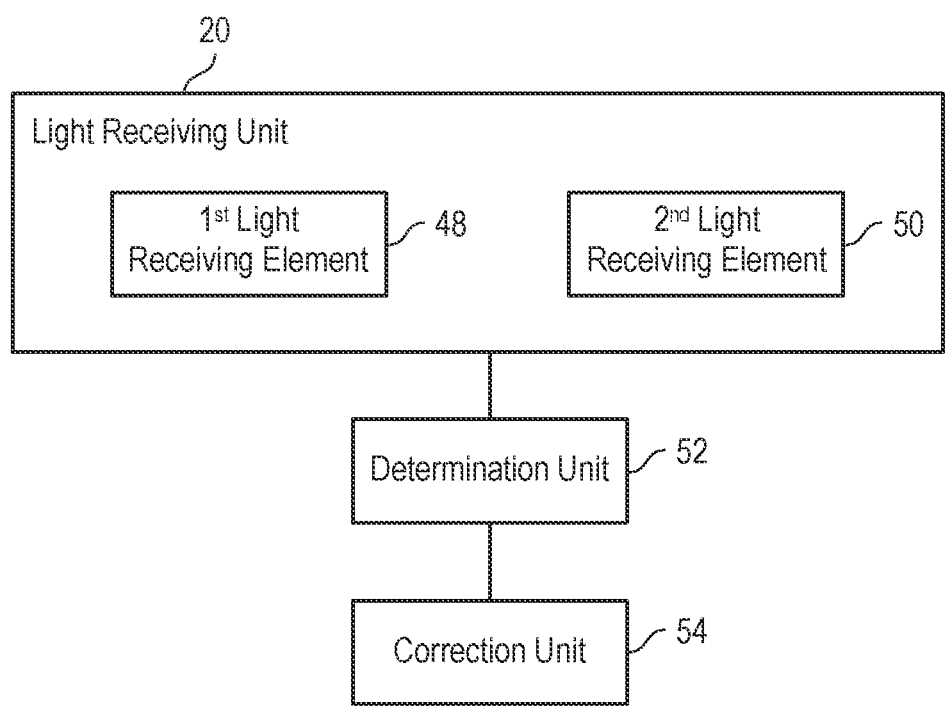
FIG. 3 is a block diagram of the encoder shown in FIG. 1 for illustrating a functional configuration thereof.

FIG. 3 is a block diagram of encoder 10 in FIG. 1 for illustrating a functional configuration thereof. The functional configuration of encoder 10 will be described with reference to FIG. 3.

As illustrated in FIG. 3, encoder 10 further includes determination unit 52 and correction unit 54.

First light receiving element 48 binarizes the intensity of the received light, outputs the binarized intensity, and transmits the binarized intensity to determination unit 52. Specifically, first light receiving element 48 compares the intensity of the received light with a predetermined threshold value, and outputs one of the two values according to the comparison result. In this embodiment, first light receiving element 48 outputs value "1" when the intensity of the received light is equal to or greater than the predetermined threshold value, and outputs value "0" when the intensity of the received light is smaller than the predetermined threshold value.

Second light receiving element 50 binarizes the intensity of the received light, outputs the binarized intensity, and transmits the binarized intensity to determination unit 52. Specifically, second light receiving element 50 compares the intensity of the received light with the predetermined threshold value, and outputs one of the two values according to the comparison result. In this embodiment, second light receiving element 50 outputs value "1" when the intensity of the received light is equal to or greater than the predetermined threshold value, and outputs value "0" when the intensity of the received light is smaller than the predetermined threshold value.

Determination unit 52 acquires the output value of first light receiving element 48 and the output value of second light receiving element 50, and determines whether these output values are erroneous or not. Specifically, when the output value of second light receiving element 50 is reversed to the output value of first light receiving element 48, determination unit 52 determines that the output value of first light receiving element 48 and the output value of second light receiving element 50 are not erroneous, and outputs the determination result. When the output value of second light receiving element 50 is not a value reversed to the output value of first light receiving element 48, determination unit 52 determines that one of the output value of first light receiving element 48 and the output value of second light receiving element 50 is erroneous, and outputs the determination result. Determination unit 52 is implemented by, e.g., a processor.

For example, when the output value of first light receiving element 48 is "1" and the output value of second light receiving element 50 is "0", determination unit 52 determines that these output values are not erroneous. When the output value of first light receiving element 48 is "0" and the output value of second light receiving element 50 is "0", determination unit 52 determines that one of these output values is erroneous.

When determination unit 52 determines that one of the output value of first light receiving element 48 and the output value of second light receiving element 50 is erroneous, correction unit 54 determines whether the output value of first light receiving element 48 is erroneous or not. When the output value of first light receiving element 48 is erroneous, correction unit 54 corrects the output value of first light receiving element 48 to a correct value and outputs the corrected output value. A determination method and a correction method performed by correction unit 54 will be described later. Correction unit 54 is implemented by, e.g., a processor.

Figure 4:
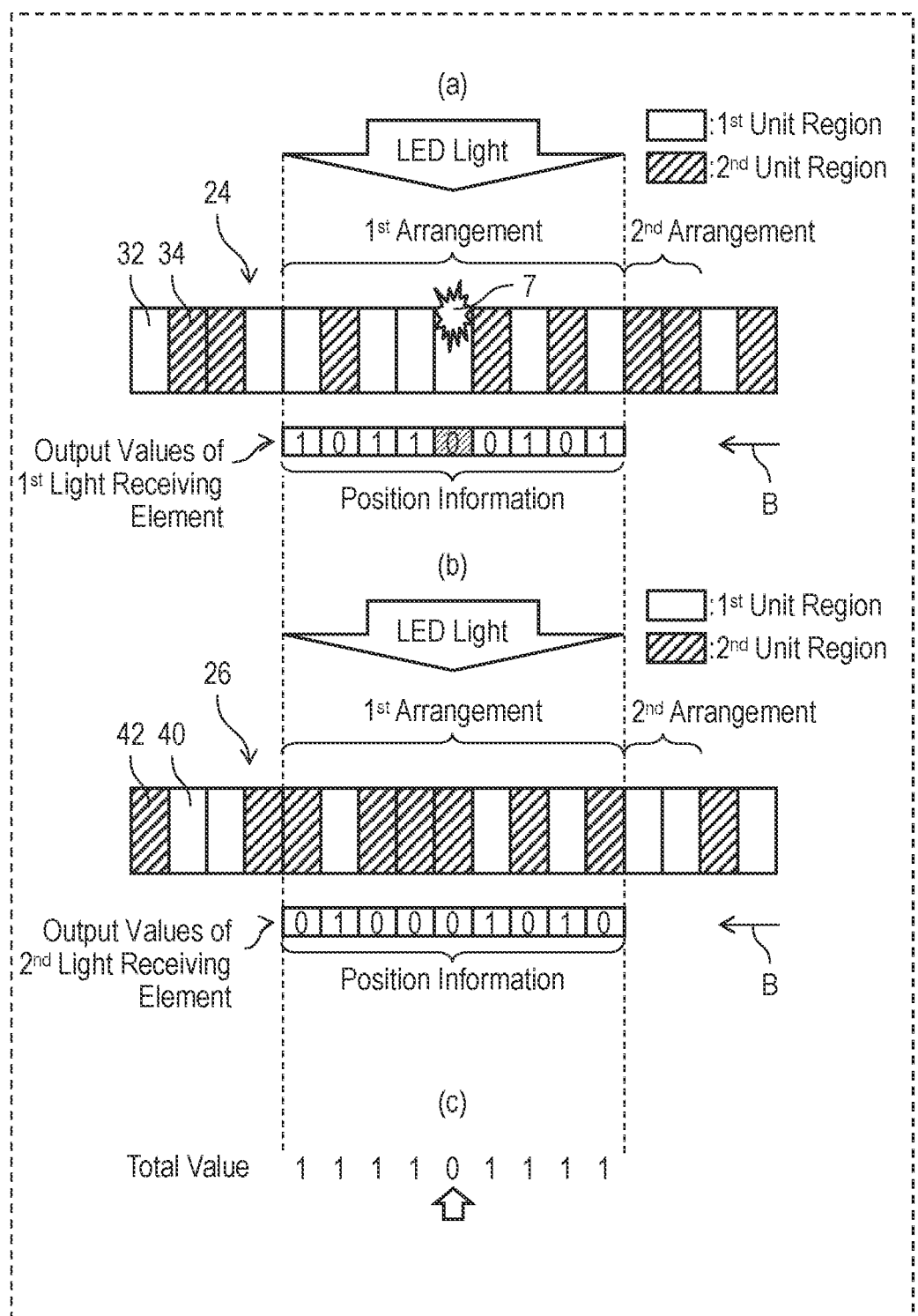
FIG. 4 is a diagram for illustrating an example of a determination method performed by a determination unit of the encoder shown in FIG. 1.
Figure 5:
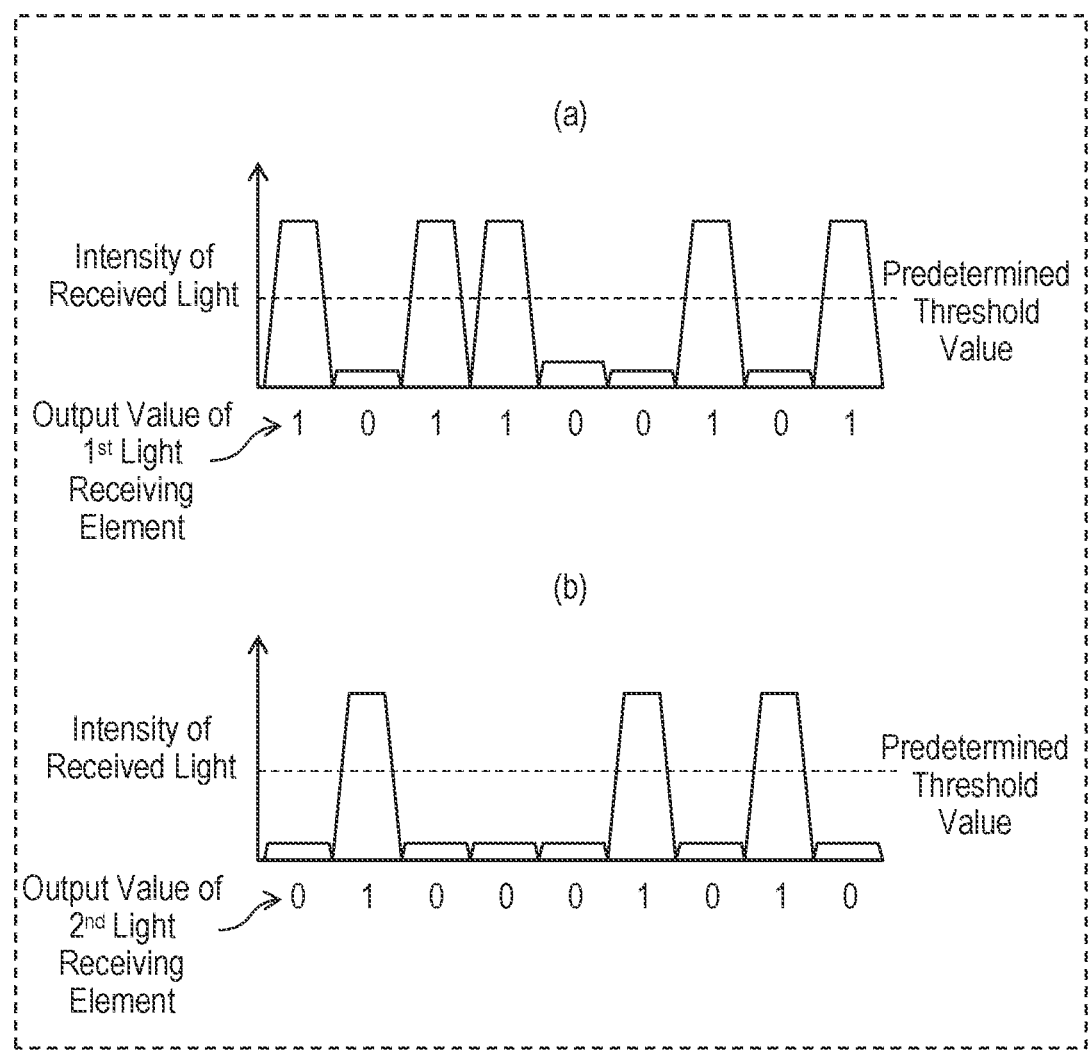
FIG. 5 is a diagram illustrating an example of a received light intensity of light received by a light receiving unit of the encoder shown in FIG. 1.

FIG. 4 is a diagram illustrating an example of the determination method performed by determination unit 52 of encoder 10 shown in FIG. 1. FIG. 4(a) schematically illustrates first pattern 24 and the output value of first light receiving element 48. FIG. 4(b) schematically illustrates second pattern 26 and the output value of second light receiving element 50. FIG. 4(c) illustrates a total value of the output value of first light receiving element 48 and the output value of second light receiving element 50. FIG. 5 is a diagram illustrating an example of a received light intensity of the light received by light receiving unit 20 of encoder 10 shown in FIG. 1. FIG. 5(a) illustrates an example of a received light intensity of light received by first light receiving element 48. FIG. 5(b) illustrates an example of a received light intensity of light received by second light receiving element 50. An example of the determination method performed by determination unit 52 will be described with reference to FIG. 4 and FIG. 5

As illustrated in FIG. 4(a), in first pattern 24, first unit regions 32 and second unit regions 34 are arranged in the rotation direction (see the arrow B in FIG. 4) of rotatable plate 12. Hereinafter, the rotation direction of rotatable plate 12 is also simply referred to as a rotation direction. The rotation direction coincides with the circumferential direction and is along the circumferential direction. Each of first unit region 32 and second unit region 34 are also simply referred to as a unit region. When first unit region 32 and second unit region 34 are referred to as unit regions, first pattern 24 includes a first arrangement that is an arrangement of M unit regions for outputting position information indicating a position of rotation shaft 5, which is the detection target, and a second arrangement adjacent to the first arrangement. The second arrangement is an arrangement of N unit regions for outputting correction information for correcting the position information. In this embodiment, M=9, and N=2.

First light receiving element 48 receives LED light emitted from light emission unit 18 and transmitted through first pattern 24, binarizes an intensity of the received light, and outputs the binarized intensity. For example, when first light receiving element 48 faces first unit region 32 and sufficiently receives light transmitted through first unit region 32, the intensity of the received light becomes equal to or greater than the predetermined threshold value, and first light receiving element 48 outputs value "1". On the other hand, when first light receiving element 48 faces second unit region 34 and does not sufficiently receive the light by second unit region 34, the intensity of the received light becomes smaller than the predetermined threshold value, and first light receiving element 48 outputs value "o".

When rotatable plate 12 rotates, first light receiving element 48 sequentially faces one of first unit regions 32 and second unit regions 34 arranged in the circumferential direction, and binarizes the received light intensity and outputs the binarized received light intensity each time first light receiving element 48 faces one of first unit regions 32 and second unit regions 34.

For example, by facing each unit region in the first arrangement, first light receiving element 48 outputs nine values. A head of the first arrangement in the rotation direction is first unit region 32. By facing first unit region 32, first light receiving element 48 receives the light emitted from light emission unit 18 and transmitted through first unit region 32. In the following description, the head in the rotation direction is also simply referred to as a head. As illustrated in FIG. 5(a), the intensity of the light received by first light receiving element 48 by facing first unit region 32 becomes equal to or greater than the predetermined threshold value, and first light receiving element 48 outputs value "1".

On the other hand, a second unit region from the head of the first arrangement is second unit region 34. When facing second unit region 34, first light receiving element 48 does not sufficiently receive the light emitted from light emission unit 18. Therefore, the intensity of the light received by first light receiving element 48 by facing second unit region 34 is smaller than the predetermined threshold value, and thus first light receiving element 48 outputs value "0".

The nine output values thus output based on the first arrangement is the position information indicating the position of rotation shaft 5, and the position and the like of rotation shaft 5 is identified by a combination of the nine output values.

Here, foreign substance 7 which prevents transmission of light adheres to fifth first unit region 32 from the head of the first arrangement. When facing first unit region 32, first light receiving element 48 does not sufficiently receive the light, the intensity of the received light becomes smaller than the predetermined threshold value, and first light receiving element 48 outputs value "0". That is, in this case, the output value obtained based on first unit region 32 is "0".

An output value output based on the second arrangement will be described later.

As illustrated in FIG. 4(b), in second pattern 26, first unit regions 40 and second unit regions 42 are arranged in the rotation direction. Hereinafter, each of first unit region 40 and second unit region 42 are also simply referred to as a unit region. Here, when first unit region 40 and second unit region 42 are referred to as unit regions, second pattern 26 includes a first arrangement that is an arrangement of M unit regions for outputting the position information indicating the position of rotation shaft 5, which is the detection target, and a second arrangement adjacent to the first arrangement. The second arrangement is an arrangement of N unit regions for outputting the correction information for correcting the position information. In this embodiment, M=9, and N=2.

Second light receiving element 50 receives LED light emitted from light emission unit 18 and transmitted through second pattern 26, binarizes an intensity of the received light, and outputs the binarized intensity. For example, when second light receiving element 50 faces first unit region 40 and receives light transmitted through first unit region 40, the intensity of the received light becomes equal to or greater than the predetermined threshold value, and second light receiving element 50 outputs value "1". On the other hand, when second light receiving element 50 faces second unit region 42 and does not sufficiently receive the light by second unit region 42, the intensity of the received light becomes smaller than the predetermined threshold value, and second light receiving element 50 outputs value "0".

When rotatable plate 12 rotates, second light receiving element 50 sequentially faces one of first unit regions 40 and second unit regions 42 arranged in the circumferential direction, and binarizes the received light intensity and outputs the binarized received light intensity each time second light receiving element 50 faces one of first unit regions 40 and second unit regions 42.

For example, by facing each unit region in the first arrangement, second light receiving element 50 outputs nine values. A head of the first arrangement is second unit region 42. When facing second unit region 42, second light receiving element 50 does not sufficiently receive the light emitted from light emission unit 18. As illustrated in FIG. 5(b), an intensity of the light received by second light receiving element 50 facing second unit region 42 is smaller than the predetermined threshold value, and thus second light receiving element 50 outputs value "0".

On the other hand, a second unit region from the head of the first arrangement is first unit region 40. When facing first unit region 40, second light receiving element 50 receives the light emitted from light emission unit 18 and transmitted through first unit region 40. The intensity of the light received by second light receiving element 50 facing first unit region 40 becomes equal to or greater than the predetermined threshold value, and second light receiving element 50 outputs value "1".

An order of the first arrangement in second pattern 26 is reversed to an order of the first arrangement in first pattern 24. Therefore, by reversing output values of second light receiving element 50 output based on the first arrangement in second pattern 26, the reversed output values of second light receiving element 50 are the same as the output values of first light receiving element 48 output based on the first arrangement in first pattern 24, and the position information indicating the position of rotation shaft 5 is obtained.

An order of the second arrangement in second pattern 26 is reversed to an order of the second arrangement in first pattern 24. Therefore, by reversing output values of second light receiving element 50 output based on the second arrangement in second pattern 26, the reversed output values of second light receiving element 50 are the same as output values of first light receiving element 48 output based on the second arrangement in first pattern 24, and the correction information for correcting the position information is obtained.

In this embodiment, reversing the output value means changing "1" to "0" and changing "0" to "1".

As illustrated in FIG. 4(c), by summing the output value of first light receiving element 48 and the output value of second light receiving element 50 corresponding to the output value, determination unit 52 determines whether or not the output value of second light receiving element 50 is the value obtained by reversing the output value of first light receiving element 48. Specifically, determination unit 52 sums the output value of first light receiving element 48 and the output value of second light receiving element 50 corresponding to the output value, and determines that these output values are reversed and not erroneous when a total value is "1". Determination unit 52 sums the output value of first light receiving element 48 and the output value of second light receiving element 50 corresponding to the output value, and determines that these output values are not reversed to each other and one of these output values is erroneous when the total value is "0".

For example, an output value "1" obtained based on the head unit region in the first arrangement of first pattern 24 corresponds to an output value "0" obtained based on the head unit region in the first arrangement of second pattern 26. When these corresponding output values are summed, "1"+"0"="1", and the total value is "1". Therefore, determination unit 52 determines that these output values are not erroneous.

On the other hand, for example, an output value "0" obtained based on a fifth unit region from the head of the first arrangement of first pattern 24 corresponds to an output value "0" obtained based on a fifth unit region from the head of the first arrangement of second pattern 26. When these corresponding output values are summed, "0"+"0"="0", and the total value is "0". Therefore, determination unit 52 determines that one of these output values is erroneous.

For example, in the case that two patterns in which first unit regions and second unit regions are arranged in the same order are provided, output values output based on a second unit region in one pattern and a second unit region in the other pattern corresponding to the second unit regions are both "0". In addition, while foreign substance 7 adheres to both the first unit region in one pattern and the first unit region in the other pattern corresponding to the first unit region, the output values output based on the two first unit regions may be both "0". In this way, when two patterns in which the first unit regions and the second unit regions are arranged in the same order are provided, it is not possible to determine whether the value is output based on the second unit region or the value is output based on the first unit region at which a foreign substance adheres. Therefore, the position and the like of rotation shaft 5 may be detected erroneously without noticing that the output value is erroneous, resulting in a decrease in detection accuracy.

In this embodiment, the output value of first light receiving element 48 is reversed to the output value of second light receiving element 50 corresponding to the output value. That is, (the output value of first light receiving element 48, the output value of second light receiving element 50 corresponding to the output value)=(1, 0) or (0, 1). Therefore, the total value of these output values is "1" in principle. Accordingly, it is determined that the output value of first light receiving element 48 and the output value of second light receiving element 50 corresponding to the output value are not erroneous when the total value is "1", and that one of these output values is erroneous when the total value is not "1". In this way, it is possible to notice that the output value is erroneous, and thus the decrease in the detection accuracy can be prevented.

In the encoder in PTL 1, when dust or the like adheres to the pattern, the light from the light source is difficult to transmit or to be reflected due to the dust or the like, and erroneous detection may occur. Further, detection accuracy may decrease due to the erroneous detection not being noticed. In addition, even the occurrence of the erroneous detection is noticed, it is difficult to correct an error, and the detection accuracy decreases.

In contrast, encoder 10 according to the embodiment can prevent the decrease in the detection accuracy as described above.

Figure 6:
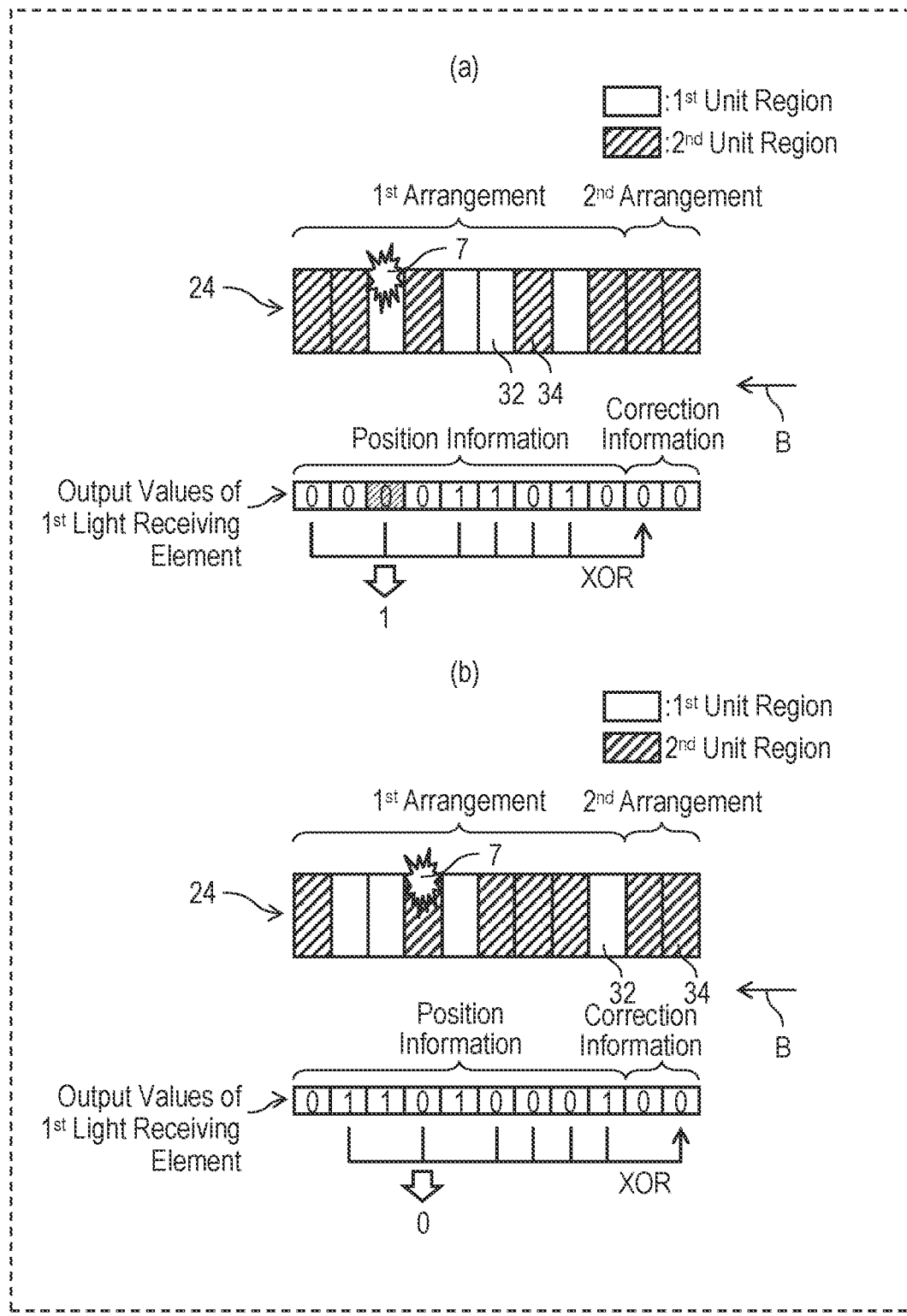
FIG. 6 is a diagram for illustrating an example of a determination method and a correction method performed by a correction unit of the encoder shown in FIG. 1.

FIG. 6 is a diagram for illustrating an example of the determination method and the correction method performed by correction unit 54 of encoder 10 shown in FIG. 1. FIG. 6(a) is a diagram for illustrating a case in which an output value output based on a head unit region in the second arrangement is used. FIG. 6(b) is a diagram for illustrating a case in which an output value output based on a second unit region from the head of the second arrangement is used.

FIG. 6(a) illustrates a method for determining, when determination unit 52 determines that one of an output value output based on a third unit region from the head of the first arrangement of first pattern 24 and an output value output based on a third unit region from the head of the first arrangement of second pattern 26 is erroneous, whether or not the output value output based on the unit region of first pattern 24 is correct and correcting the output value when the output value is erroneous.

As illustrated in FIG. 6(a), correction unit 54 acquires nine output values output based on the first arrangement and two output values output based on the second arrangement. The two output values output based on the second arrangement are output values output from first light receiving element 48 similarly to the nine output values output based on the first arrangement. The two output values output based on the second arrangement are correction information for correcting at least one of the nine output values which are the position information indicating the position of rotation shaft 5.

In this embodiment, an output value output based on the head unit region in the second arrangement is information for determining whether one output value determined by determination unit 52 to have a possibility of being erroneous among output values output based on the head unit region and a third, a fifth, a sixth, a seventh, and an eighth unit regions from the head of the first arrangement is erroneous, and is information for correcting the one output value when the one output value is erroneous.

When a value obtained by taking an exclusive OR of the output values output based on the head unit region and the third unit region from the head of the first arrangement is referred to as a first value, a value obtained by taking an exclusive OR of the first value and the output value output based on the fifth unit region from the head is referred to as a second value, a value obtained by taking an exclusive OR of the second value and the output value output based on the sixth unit region from the head is referred to as a third value, a value obtained by taking an exclusive OR of the third value and the output value output based on the seventh unit region from the head is referred to as a fourth value, and a value obtained by taking an exclusive OR of the fourth value and the output value output based on the eighth unit region from the head is referred to as a fifth value, the output value obtained based on the head unit region of the second arrangement is equal to the fifth value.

For example, when the output value output based on the head unit region in the second arrangement is "0", a total value of the output values output based on the head unit region and the third, the fifth, the sixth, the seventh, and the eighth unit regions from the head of the first arrangement is an even number.

On the other hand, when the output value output based on the head unit region in the second arrangement is "1", the total value of the output values output based on the head unit region and the third, the fifth, the sixth, the seventh, and the eighth unit regions from the head of the first arrangement is an odd number.

In FIG. 6(a), the output value obtained based on the head unit region in the second arrangement is "0". The total value of the output values output based on the head unit region and the third, the fifth, the sixth, the seventh, and the eighth unit regions from the head of the first arrangement is "0"+"0"+"1"+"1"+"0"+"1"="3", which is an odd number. Therefore, it is determined that one of the output values output based on the head unit region and the third, the fifth, the sixth, the seventh, and the eighth unit regions from the head of the first arrangement is erroneous.

As described above, here, it is determined that one of the output value output based on the third unit region from the head of the first arrangement of first pattern 24 and the output value output based on the third unit region from the head of the first arrangement of second pattern 26 is erroneous. Therefore, correction unit 54 determines that the output value obtained based on the third unit region from the head of the first arrangement of first pattern 24 among the output values output based on the head unit region and the third, the fifth, the sixth, the seventh, and the eighth unit regions from the head is erroneous, corrects the output value from "0" to "1", and outputs the corrected output value.

FIG. 6(b) illustrates a method for determining, when determination unit 52 determines that one of an output value output based on a fourth unit region from the head of the first arrangement of first pattern 24 and an output value output based on a fourth unit region from the head of the first arrangement of second pattern 26 is erroneous, whether or not the output value output based on the unit region of first pattern 24 is correct and correcting the output value when the output value is erroneous.

As illustrated in FIG. 6(b), similarly to the case illustrated in FIG. 6(a), correction unit 54 acquires nine output values obtained based on the first arrangement and two output values obtained based on the second arrangement.

In this embodiment, an output value output based on a second unit region from the head of the second arrangement is information for determining whether or not one output value determined by determination unit 52 to have a possibility of being erroneous among output values output based on the second, the fourth, a sixth, a seventh, an eighth, and a ninth unit regions from the head of the first arrangement is erroneous, and is information for correcting the one output value when the one output value is erroneous.

When a value obtained by taking an exclusive OR of the output values output based on the second and the fourth unit regions from the head of the first arrangement is referred to as a sixth value, a value obtained by taking an exclusive OR of the sixth value and the output value output based on the sixth unit region from the head is referred to as a seventh value, a value obtained by taking an exclusive OR of the seventh value and the output value output based on the seventh unit region from the head is referred to as an eighth value, a value obtained by taking an exclusive OR of the eighth value and the output value output based on the eighth unit region from the head is referred to as a ninth value, and a value obtained by taking an exclusive OR of the ninth value and the output value output based on the ninth unit region from the head is referred to as a tenth value, the output value output based on the second unit region from the head of the second arrangement is equal to the tenth value.

For example, when the output value obtained based on the second unit region from the head of the second arrangement is "0", a total value of the output values output based on the second, the fourth, the sixth, the seventh, the eighth, and the ninth unit regions from the head of the first arrangement is an even number.

On the other hand, when the output value obtained based on the second unit region from the head of the second arrangement is "1", the total value of the output values output based on the second, the fourth, the sixth, the seventh, the eighth, and the ninth unit regions from the head of the first arrangement is an odd number.

In FIG. 6(b), the output value output based on the second unit region from the head of the second arrangement is "0". The total value of the output values output based on the second, the fourth, the sixth, the seventh, the eighth, and the ninth unit regions from the head of the first arrangement is "1"+"0"+"0"+"0"+"0"+"1"="2", which is an even number. Therefore, correction unit 54 determines that the output value output based on the fourth unit region from the head of the first arrangement of first pattern 24 is not erroneous, and outputs "0" without correcting the output value.

By reversing the output values output based on the first arrangement and the second arrangement of second pattern 26, the same processing as described above is performed.

Figure 7:
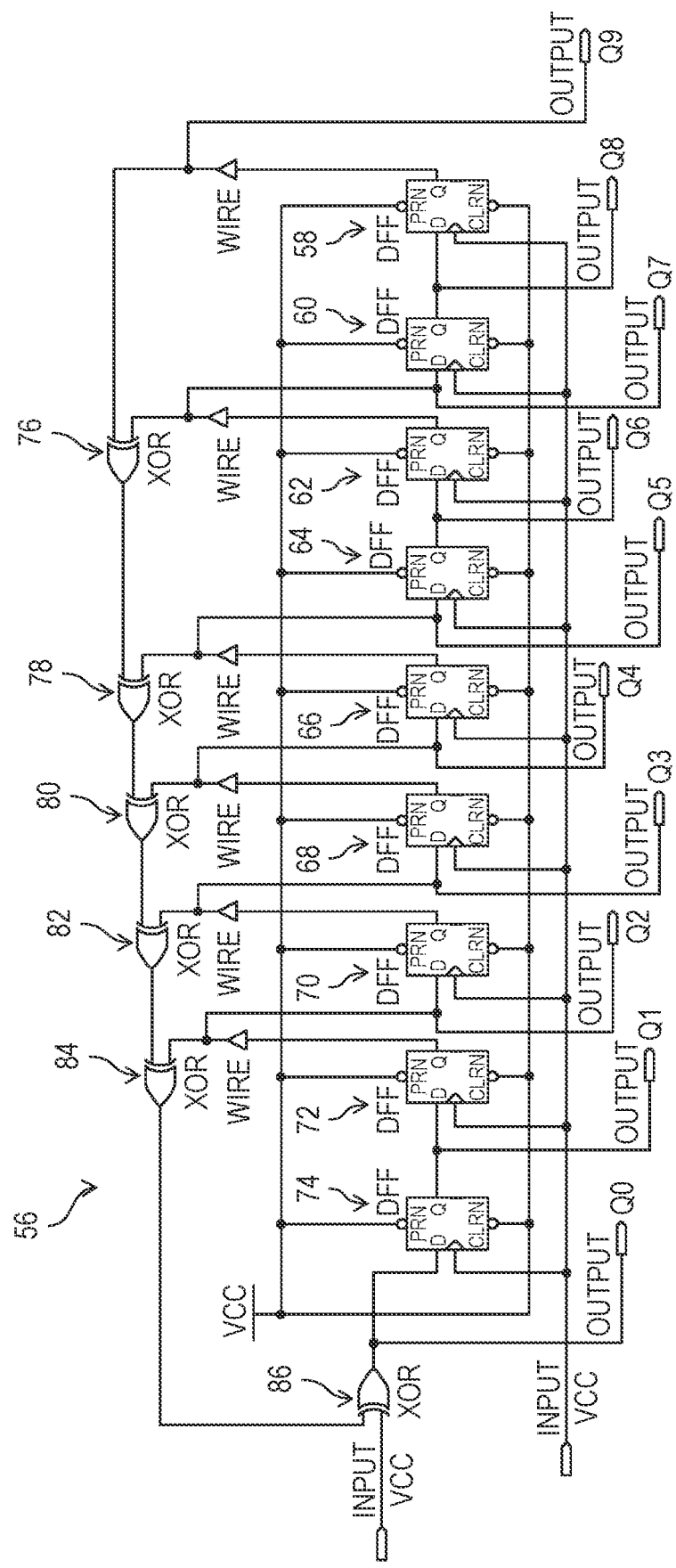
FIG. 7 is a diagram illustrating a calculation circuit that calculates values for forming a first pattern on the rotatable plate of the encoder shown in FIG. 1.
Figure 8:
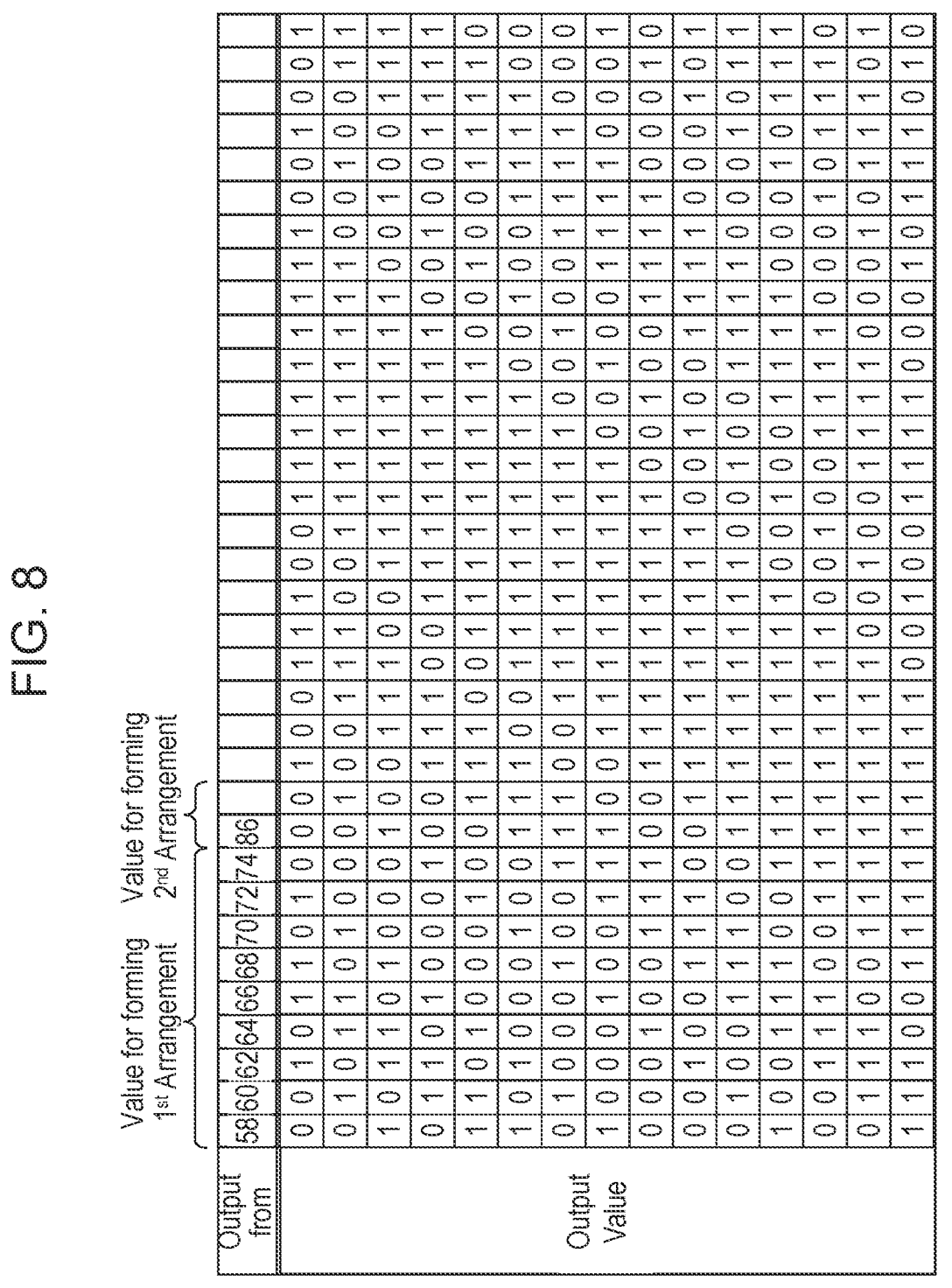

FIG. 7 is a diagram illustrating calculation circuit 56 that calculates values for forming first pattern 24 on rotatable plate 12 of encoder 10 shown in FIG. 1. FIG. 8 is a table illustrating values obtained by calculation circuit 56 shown in FIG. 7.

Calculation circuit 56 illustrated in FIG. 7 is a circuit for calculating a value based on an M code (irreducible polynomial): $X^9+X^7+X^5+X^4+X^3+X^2+1$. It is possible to form first pattern 24 including the first arrangement and the second arrangement by forming first pattern 24 based on the values obtained by calculation circuit 56.

As illustrated in FIG. 7, calculation circuit 56 includes plural registers 58 to 74 and plural XOR circuits 76 to 86.

Each of the registers 58 to 74 stores a value used for operation performed by calculation circuit 56, and outputs the stored value.

A value output from register 60 is input to register 58. A value output from register 62 is input to XOR circuit 76 and register 60. A value output from register 64 is input to register 62. A value output from register 66 is input to XOR circuit 78 and register 64. A value output from register 68 is input to XOR circuit 80 and register 66. A value output from register 70 is input to XOR circuit 82 and register 68. A value output from register 72 is input to XOR circuit 84 and register 70. A value output from register 74 is input to register 72.

Each of the XOR circuits 76 to 86 calculates an exclusive logical sum of input two values and outputs a calculated value. A value output from register 58 and the value output from register 62 are input to XOR circuit 76, and XOR circuit 76 calculates an exclusive logical sum of these two values and outputs a calculated value. The value output from register 66 and the value output from XOR circuit 76 are input to XOR circuit 78, and XOR circuit 78 calculates an exclusive logical sum of these two values and outputs a calculated value. The value output from register 68 and the value output from XOR circuit 78 are input to XOR circuit 80, and XOR circuit 80 calculates an exclusive logical sum of these two values and outputs a calculated value. The value output from register 70 and the value output from XOR circuit 80 are input to XOR circuit 82, and XOR circuit 82 calculates an exclusive logical sum of these two values and outputs a calculated value. The value output from register 72 and the value output from XOR circuit 82 are input to XOR circuit 84, and XOR circuit 84 calculates an exclusive logical sum of these two values and outputs a calculated value. A predetermined value input from the outside and the value output from XOR circuit 84 are input to XOR circuit 86, and XOR circuit 86 calculates an exclusive logical sum of these two values and outputs a calculated value. For example, the predetermined value is one value previously determined. The value output from XOR circuit 86 is input to register 74.

Each time a value is newly input, each of the registers 58 to 74 outputs the input value. Each time two values are newly input, each of the XOR circuits 76 to 86 calculates an exclusive logical sum of the two input values and outputs the calculated value.

Here, a case in which registers 58, 60, 64, 70, and 74 previously store value "0" and registers 62, 66, 68, and 72 previously store value "1" will be described below.

In this case, first, registers 58, 60, 64, 70, and 74 output value "0", and registers 62, 66, 68, and 72 output value "1".

XOR circuit 76 outputs value "1" which is an exclusive logical sum of values "0" and "1". XOR circuit 78 outputs "0" which is an exclusive logical sum of "1" and "1". XOR circuit 80 outputs "1" which is an exclusive logical sum of "1" and "0". XOR circuit 82 outputs "1" which is the exclusive logical sum of "0" and "1". XOR circuit 84 outputs "0" which is the exclusive logical sum of "1" and "1". Value "0" is input to XOR circuit 86 from the outside.

XOR circuit 86 outputs value "0" which is an exclusive logical sum of values "0" and "0".

As described above, each time a value is newly input, each of the registers 58 to 74 outputs the input value. Each time two values are newly input, each of the XOR circuits 76 to 86 calculates the exclusive logical sum of the two input values and outputs the calculated value. As described above, values illustrated in FIG. 8 are obtained by repeating calculation and output of the exclusive logical sum.

As illustrated in FIG. 8, nine output values output from the registers 58 to 74 are values for forming the first arrangement. For example, when looking at the top of the output values of the table illustrated in FIG. 8, the nine output values output from the registers 58 to 74 are "001011010". In this case, the first arrangement is formed by arranging second unit region 34, second unit region 34, first unit region 32, second unit region 34, first unit region 32, first unit region 32, second unit region 34, first unit region 32, and second unit region 34 in this order in the circumferential direction.

The value output from register 60 is subsequently output from register 58. The value output from register 62 is subsequently output from register 60. The value output from register 64 is subsequently output from register 62. The value output from register 66 is subsequently output from register 64. The value output from register 68 is subsequently output from register 66. The value output from register 70 is subsequently output from register 68. The value output from register 72 is subsequently output from register 70. The value output from register 74 is subsequently output from register 72. The value output from XOR circuit 86 is subsequently output from register 74. XOR circuit 86 calculates a new value based on these values and outputs the calculated value. This processing is repeatedly performed.

As described above, the nine output values output from the registers 58 to 74 are the values for forming the first arrangement. The value output from XOR circuit 86 together with the nine output values and a value output from XOR circuit 86 after the value are values for forming the second arrangement corresponding to the first arrangement formed based on the nine output values.

By repeatedly outputting values by the registers 58 to 74 and XOR circuit 86, plural values for forming the first arrangement are obtained, and plural first arrangements are formed. That is, first pattern 24 formed using the values illustrated in FIG. 8 includes plural first arrangements. The plural first arrangements in first pattern 24 are continuously formed such that the unit regions are shifted one by one. That is, an arrangement of nine unit regions in first pattern 24 is the first arrangement, and nine arrangements in which unit regions are shifted one by one in the circumferential direction with respect to the arrangement of the nine unit regions are also first arrangements. The plural first arrangements are different from one another in the order of first unit regions 32 and second unit regions 34 arranged. That is, the plural first arrangements are formed so that the arrangements of nine output values obtained based on the plural first arrangements are not the same.

By repeatedly outputting values by the registers 58 to 74 and XOR circuit 86, plural values for forming the second arrangement are obtained, and plural second arrangements are formed. That is, first pattern 24 formed using the values illustrated in FIG. 8 includes plural second arrangements. The plural second arrangements in first pattern 24 respectively correspond to the plural first arrangements described above, and each of the plural second arrangements is an arrangement of two unit regions and is adjacent to the corresponding first arrangement. Each of the plural second arrangements is an arrangement for outputting the correction information for correcting the output values output based on the corresponding first arrangement. The plural second arrangements in first pattern 24 are continuously formed such that the unit regions are shifted one by one. That is, an arrangement of two unit regions in first pattern 24 is the second arrangement, and two arrangements in which unit regions are shifted one by one in the circumferential direction with respect to the arrangement of the two unit regions are also second arrangements.

Figure 9:
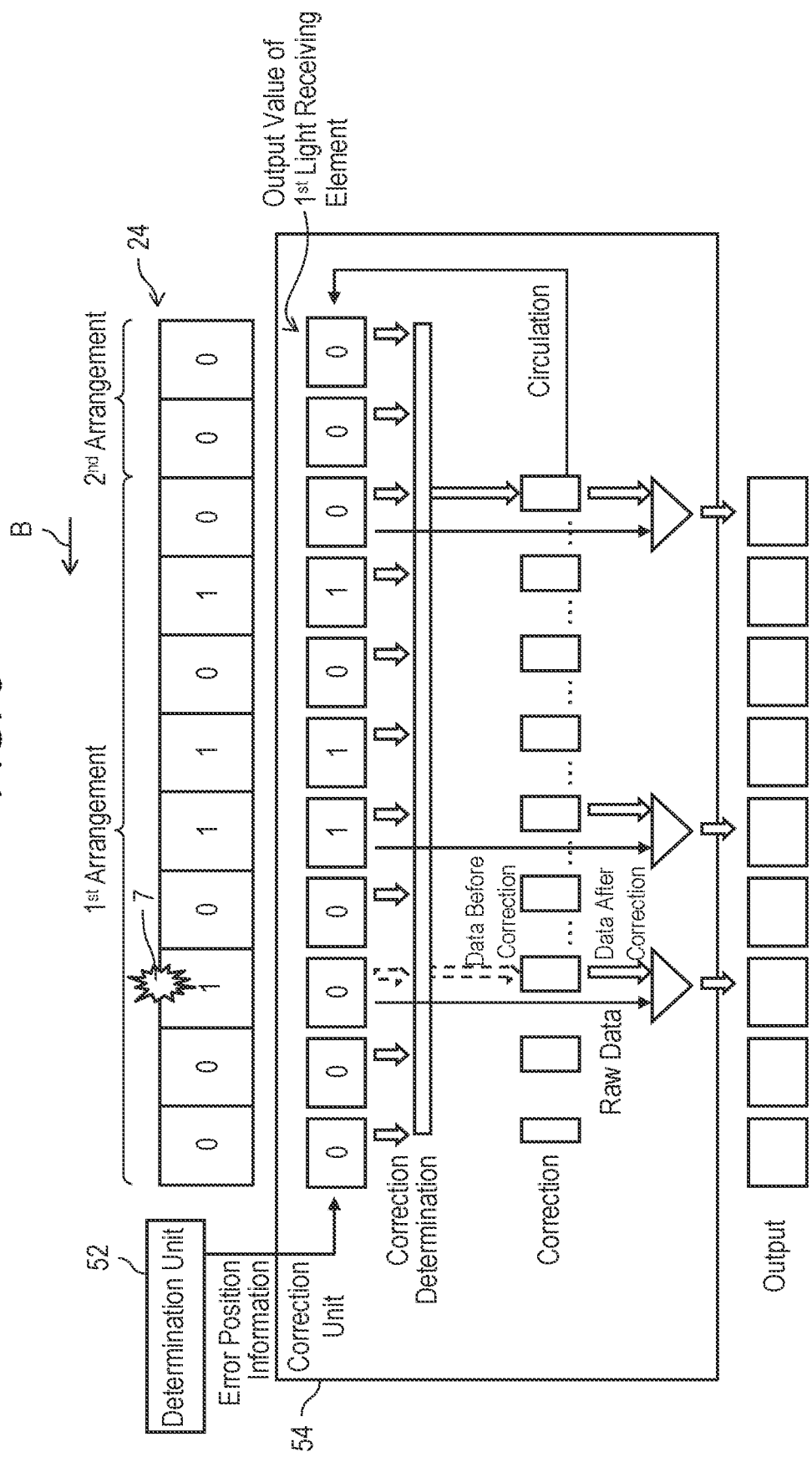
FIG. 9 is a diagram illustrating a flow of data during an operation of the correction unit of the encoder shown in FIG. 1.

FIG. 9 is a diagram illustrating a flow of data during operation of correction unit 54 of encoder 10 shown in FIG. 1. In FIG. 9, in the first arrangement and the second arrangement, value "1" indicates first unit region 32, and value "0" indicates second unit region 34. In FIG. 9, a case where foreign substance 7 adheres to the third unit region from the head of the first arrangement of first pattern 24 will be described.

As illustrated in FIG. 9, determination unit 52 determines, based on these output values, whether or not no error is present in nine output values output by first light receiving element 48 and nine output values output by second light receiving element 50. The determination method performed by determination unit 52 is omitted here by referring to the above description. Determination unit 52 transmits, to correction unit 54, error location information indicating an output value having a possibility of being erroneous.

Correction unit 54 recognizes, based on the error location information, the output value having a possibility of being erroneous among the output values of first light receiving element 48 output based on the first arrangement. Here, the error location information indicates that the output value output based on the third unit region from the head has a possibility of being erroneous.

Correction unit 54 performs error determination of whether the output value having a possibility of being erroneous is erroneous. Specifically, correction unit 54 determines whether or not the output value having a possibility of being erroneous among the output values of first light receiving element 48 is erroneous using an output value other than the output value. The determination method performed by correction unit 54 is omitted here by referring to the above description.

When the output value of first light receiving element 48 is erroneous, correction unit 54 performs correction operation on uncorrected data, and calculates corrected data. The corrected data is a value obtained by correcting the output value of first light receiving element 48. The correction method performed by correction unit 54 is omitted here by referring to the above description.

After calculating the corrected data, correction unit 54 performs circulation to determine whether another erroneous output value is present among the output values of first light receiving element 48.

After correcting all correctable output values, correction unit 54 selects raw data or the corrected data and outputs the selected data to the outside. The raw data is a value identical to the output value of first light receiving element 48. Correction unit 54 outputs corrected data for the erroneous output value.

Figure 10:
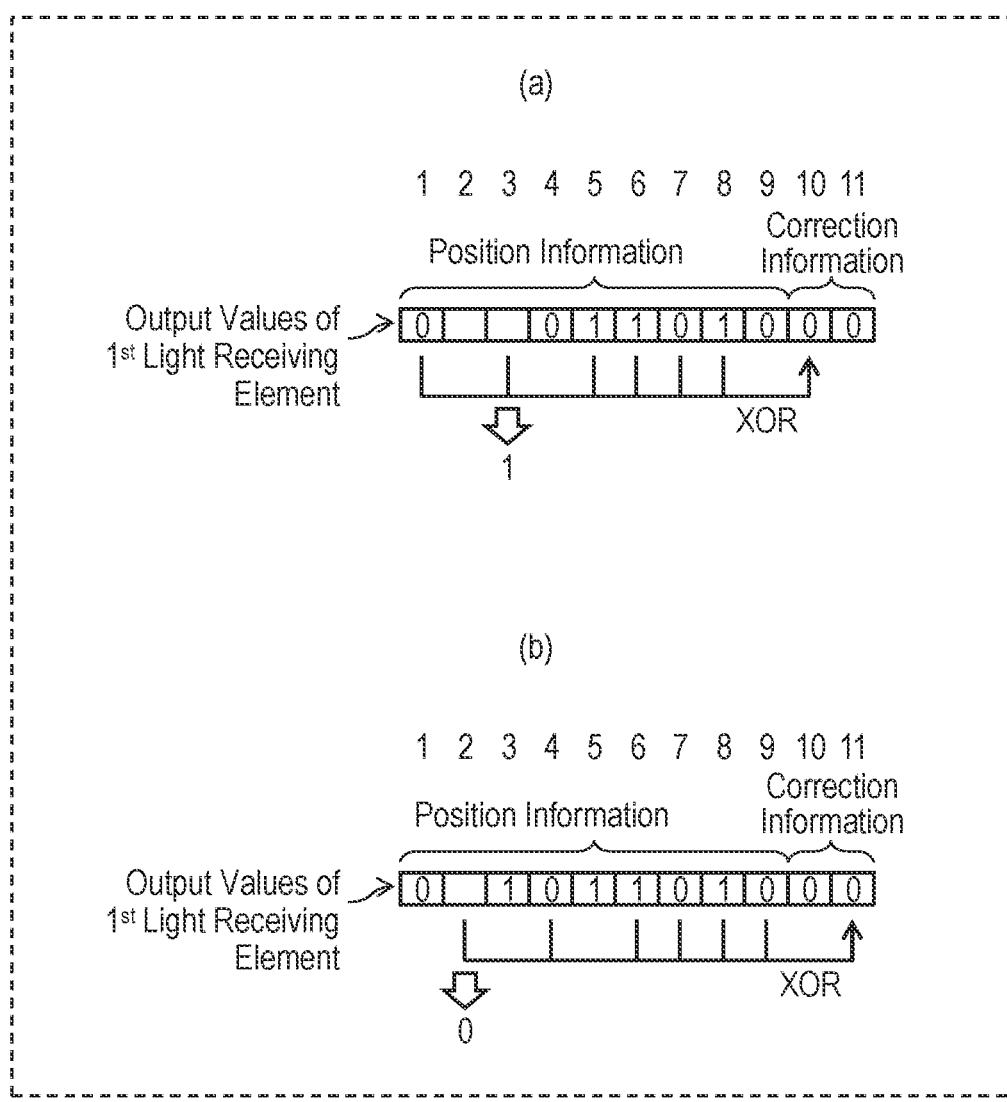
FIG. 10 is a diagram for illustrating another example of the correction method performed by the correction unit of the encoder shown in FIG. 1.

FIG. 10 is a diagram for illustrating another example of the correction method performed by correction unit 54 of encoder 10 in FIG. 1. FIG. 10(*a*) is a diagram for illustrating correction on one output value among the output values of first light receiving element 48. FIG. 10(*b*) is a diagram for illustrating correction on another output value among the output values of first light receiving element 48. A case in which two output values among the output values of first light receiving element 48 are corrected will be described with reference to FIG. 10.

As illustrated in FIG. 10(*a*), correction unit 54 acquires two output values (correction information) output based on the second arrangement in addition to nine output values (position information) output based on the first arrangement.

The output value obtained based on the head unit region in the second arrangement is "0". A total value of the output values output based on the head unit region and the fifth, the sixth, the seventh, and the eighth unit regions from the head of the first arrangement is "0"+"1"+"1"+"0"+"1"="3", which is an odd number. Therefore, in order to set the total value to an even number, correction unit 54 sets the output value output based on the third unit region from the head of the first arrangement to "I" and outputs value "1".

Next, as illustrated in FIG. 10(*b*), correction unit 54 corrects the output value output based on the second unit region from the head of the first arrangement.

The output value output based on the second unit region from the head of the second arrangement is "0". A total value of the output values output based on the fourth, the sixth, the seventh, the eighth, and the ninth unit regions from the head of the first arrangement is "0"+"1"+"0"+"1"+"0"="2", which is an even number. Therefore, in order to maintain the total value as an even number, correction unit 54 sets the output value output based on the second unit region from the head of the first arrangement to "0" and outputs value "0".

Figure 11:
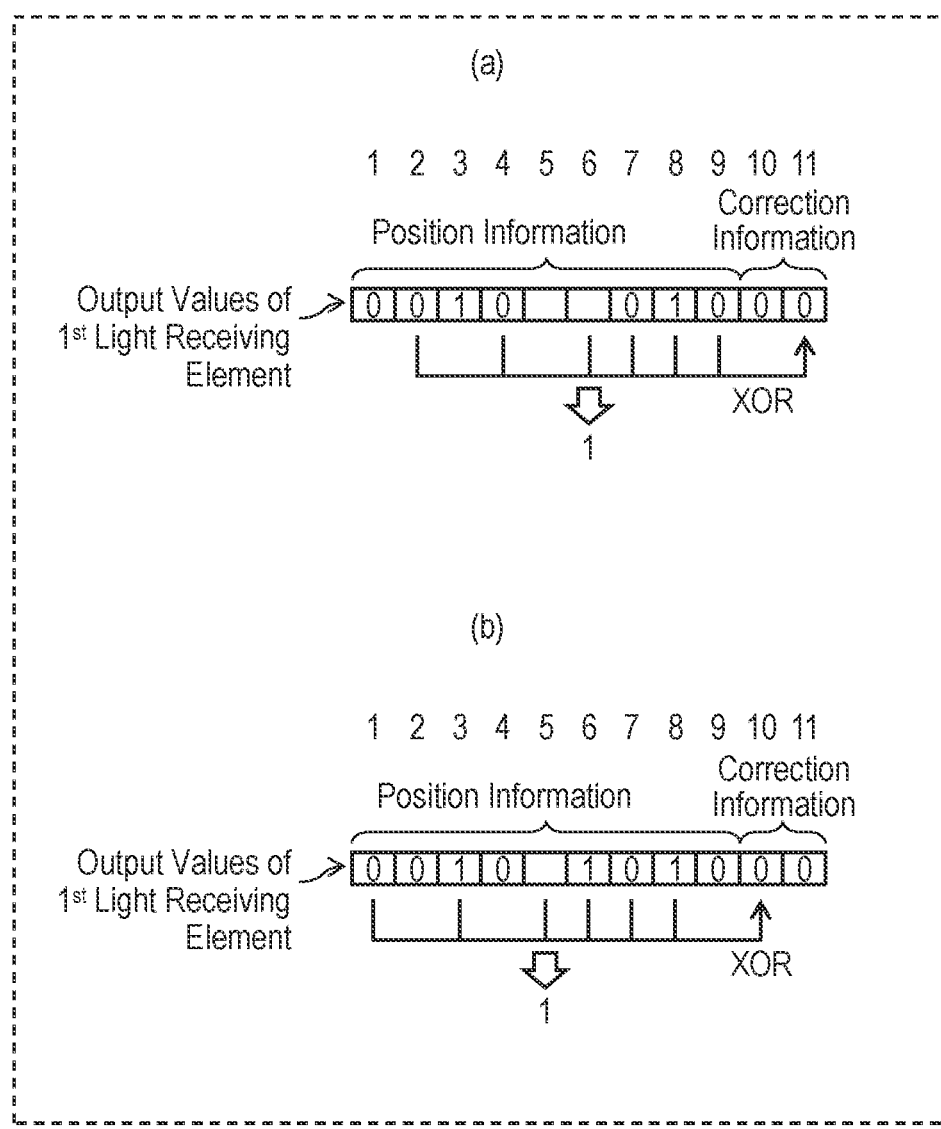
FIG. 11 is a diagram for illustrating another example of the correction method performed by the correction unit of the encoder shown in FIG. 1.

FIG. 11 is a diagram for illustrating still another example of the correction method performed by correction unit 54 of encoder 10 shown in FIG. 1. FIG. 11(*a*) is a diagram for illustrating correction on one output value among the output values of first light receiving element 48. FIG. 11(*b*) is a diagram for illustrating correction on another output value among the output values of first light receiving element 48. A case in which two output values among the output values of first light receiving element 48 are corrected will be described with reference to FIG. 11.

As illustrated in FIG. 11(*a*), the output value obtained based on the second unit region from the head of the second arrangement is "0". A total value of the output values output based on the second, the fourth, the seventh, the eighth, and the ninth unit regions from the head of the first arrangement is "0"+"o"+"0"+"1"+"0"="1", which is an odd number. Therefore, in order to set the total value to an even number, correction unit 54 sets the output value output based on the sixth unit region from the head of the first arrangement to "1" and outputs value "1".

Next, as illustrated FIG. 11(*b*), correction unit 54 corrects the output value output based on the fifth unit region from the head of the first arrangement using the corrected value.

The output value output based on the head unit region in the second arrangement is "0". A total value of the output values output based on the head unit region and the third, the sixth, the seventh, and the eighth unit regions from the head of the first arrangement is "0"+"I"+"1"+"0"+"1"="3", which is an odd number. Therefore, in order to set the total value to an even number, correction unit 54 sets the output value output based on the fifth unit region from the head of the first arrangement to "1" and outputs value "1".

Figure 12:
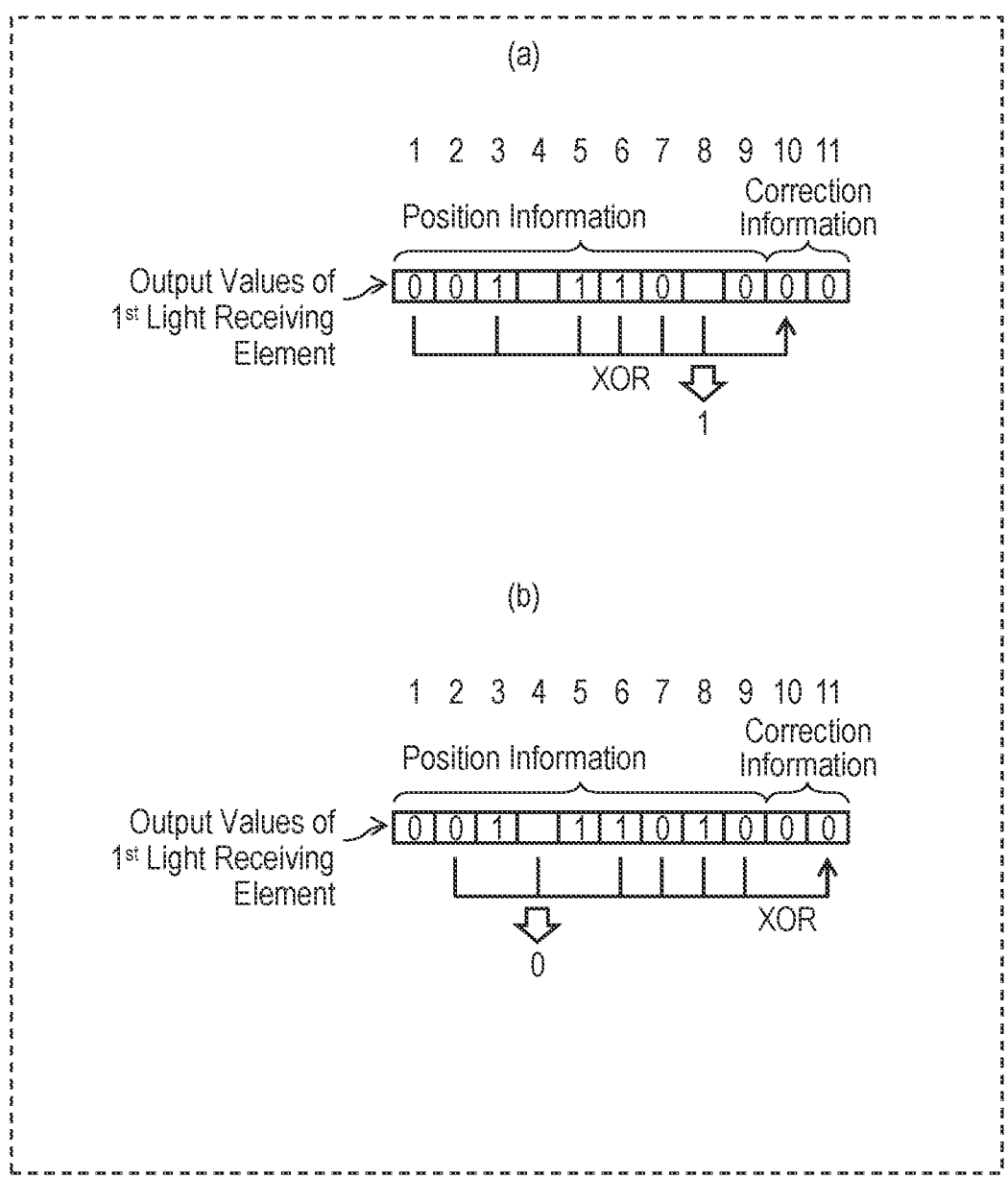
FIG. 12 is a diagram for illustrating still another example of the correction method performed by the correction unit of the encoder shown in FIG. 1.

FIG. 12 is a diagram for illustrating a further example of the correction method performed by correction unit 54 of encoder 10 shown in FIG. 1. FIG. 12(*a*) is a diagram for illustrating correction on one output value among the output values of first light receiving element 48. FIG. 12(*b*) is a diagram for illustrating correction on another output value among the output values of first light receiving element 48. A case in which two output values among the output values of first light receiving element 48 are corrected will be described with reference to FIG. 12.

As illustrated in FIG. 12(a), the output value obtained based on the head unit region in the second arrangement is "0". A total value of the output values output based on the head unit region and the third, the fifth, the sixth, and the seventh unit regions from the head of the first arrangement is "0"+"1"+"1"+"1"+"0"="3", which is an odd number. Therefore, in order to set the total value to an even number, correction unit 54 sets the output value output based on the eighth unit region from the head of the first arrangement to "1" and outputs value "1".

Next, as illustrated in FIG. 12(b), correction unit 54 corrects the output value output based on the fourth unit region from the head of the first arrangement using the corrected value.

The output value output based on the second unit region from the head of the second arrangement is "0". A total value of the output values output based on the second, the sixth, the seventh, the eighth, and the ninth unit regions from the head of the first arrangement is "0"+"1"+"0"+"1"+"0"="2", which is an even number. Therefore, in order to maintain the total value as an even number, correction unit 54 sets the output value output based on the fourth unit region from the head of the first arrangement to "0" and outputs value "0".

Correction unit 54 thus further correct other output values using the corrected output value.

Encoder 10 according to the embodiment is described above.

Encoder 10 according to the embodiment includes rotatable plate 12 including first pattern 24 and second pattern 26, light emission unit 18 configured to emit light to first pattern 24 and second pattern 26, and light receiving unit 20 configured to receive light emitted from light emission unit 18 and passing through first pattern 24 and light emitted from light emission unit 18 and passing through second pattern 26. First pattern 24 includes first unit regions 32 and second unit regions 34 which are arranged in the circumferential direction about the rotation axis A of rotatable plate 12. Each first unit region 32 is configured to guide the light emitted from light emission unit 18 to light receiving unit 20. Each second unit region 34 is configured not to guide the light emitted from light emission unit 18 to light receiving unit 20. Second pattern 26 includes first unit regions 40 and second unit regions 42 which are arranged in the circumferential direction about the rotation axis A of rotatable plate 12. Each first unit region 40 is configured to guide the light emitted from light emission unit 18 to light receiving unit 20. Each second unit region 42 is configured not to guide the light emitted from light emission unit 18 to light receiving unit 20. The order in which first unit regions 32 and second unit regions 34 are arranged in first pattern 24 is reversed to the order in which first unit regions 40 and second unit regions 42 are arranged in second pattern 26.

In this configuration, the light guided from first pattern 24 is reversed to the light guided from second pattern 26. Specifically, when first pattern 24 guides the light to light receiving unit 20, second pattern 26 does not guide the light to light receiving unit 20. When first pattern 24 does not guide the light to light receiving unit 20, second pattern 26 guides the light to light receiving unit 20. Therefore, when the light is not guided to light receiving unit 20 from both first pattern 24 and second pattern 26, it is possible to notice that abnormality occurs. For example, when foreign substance 7 adheres to both first pattern 24 and second pattern 26 and the light is not guided to light receiving unit 20 from both first pattern 24 and second pattern 26, it is also possible to notice that abnormality occurs. In this way, it is possible to prevent occurrence of erroneous detection and the decrease in the detection accuracy by noticing the occurrence of an abnormality.

Encoder 10 according to the embodiment further includes determination unit 52. Light receiving unit 20 includes first light receiving element 48 and second light receiving element 50. The first light receiving element 48 is configured to receive the light emitted from light emission unit 18 and passing through first pattern 24, binarize the intensity of the received light, and output the binarized intensity. The second light receiving element 50 is configured to receive the light emitted from light emission unit 18 and passing through second pattern 26, binarize the intensity of the received light, and output the binarized intensity. Second pattern 26 is provided such that the output value of second light receiving element 50 is reversed to the output value of first light receiving element 48. When the output value of second light receiving element 50 is not the value reversed to the output value of first light receiving element 48, determination unit 52 determines that one of the output value of first light receiving element 48 and the output value of second light receiving element 50 is erroneous, and outputs the determination result.

This configuration reverses the output value of first light receiving element 48 based on the light passing through first pattern 24 and the output value of second light receiving element 50 based on the light passing through second pattern 26. When these output values are not reversed to each other, determination unit 52 determines that one of these output values is erroneous. In this way, it is possible to easily notice that the output value is erroneous and to further prevent the occurrence of the erroneous detection, and thus it is possible to further prevent the decrease in the detection accuracy.

When first unit region 32 and second unit region 34 are referred to as unit regions, first pattern 24 includes one or more first arrangements and one or more second arrangements each of which is adjacent to respective one of the one or more first arrangements. Each first arrangement is an arrangement of nine unit regions for outputting the position information indicating the position of rotation shaft 5. Each second arrangement is an arrangement of two unit regions for outputting the correction information for correcting the position information.

In this configuration, first pattern 24 includes the one or more second arrangements each of which is an arrangement of two unit regions for outputting the correction information for correcting the position information. Therefore, when at least one of the one or more first arrangements does not normally guide the light from light emission unit 18 to light receiving unit 20 and the position information is erroneous, it is possible to correct the position information based on the correction information and to prevent the decrease in the detection accuracy.

First pattern 24 includes plural first arrangements and plural second arrangements each corresponding to respective one of the plural first arrangements.

In this configuration, the correction information is obtained for each of plural pieces of position information obtained based on the plural first arrangements. Therefore, even when any position information among the plural pieces of position information is erroneous, the correction is performed based on the corresponding correction information, and the detection accuracy can be prevented from being decreased.

Next, another example of the correction method performed by correction unit 54 will be described.

Figure 13:
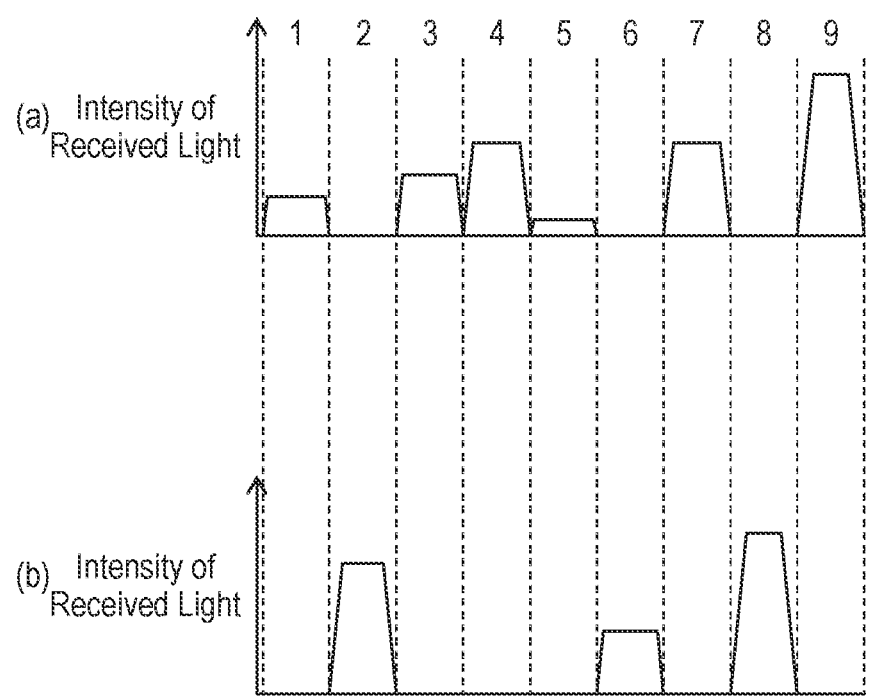
FIG. 13 is a diagram illustrating another example of the received light intensity of the light received by the light receiving unit of the encoder shown in FIG. 1.

FIG. 13 is a diagram illustrating another example of the received light intensity of the light received by light receiving unit 20 of encoder 10 shown in FIG. 1. FIG. 13(a) is a diagram illustrating another example of the received light intensity of the light received by first light receiving element 48. FIG. 13(b) is a diagram illustrating another example of the received light intensity of the light received by second light receiving element 50.

In the above description, a case in which correction unit 54 corrects an error in the output value output based on the first arrangement based on the output value output based on the second arrangement is described, and the present disclosure is not limited thereto. For example, correction unit 54 may acquire the received light intensity of the light received by first light receiving element 48 and the received light intensity of the light received by second light receiving element 50, and correct, based on the acquired received light intensities, the error in the output value obtained based on the first arrangement.

Here, a case will be described in which both the output value output based on the fifth unit region from the head of the first arrangement of first pattern 24 and the output value output based on the fifth unit region from the head of the first arrangement of second pattern 26 are "0" and determination unit 52 determines that one of these output values is erroneous.

In this case, as illustrated in FIG. 13, correction unit 54 acquires the received light intensity of the light received by first light receiving element 48 based on the fifth unit region from the head of the first arrangement of first pattern 24 and the received light intensity of the light received by second light receiving element 50 based on the fifth unit region from the head of the first arrangement of second pattern 26. Correction unit 54 compares these acquired received light intensities and corrects an error in the output values based on a comparison result. Specifically, the received light intensity of the light received by first light receiving element 48 is larger than the received light intensity of the light received by second light receiving element 50. Therefore, correction unit 54 corrects the output value of first light receiving element 48 to value "1", outputs the corrected output value, and outputs the output value of second light receiving element 50 as "0".

Next, calculation circuit 88 which calculates values for forming a first pattern different from first pattern 24 of encoder 10 will be described.

Figure 14:
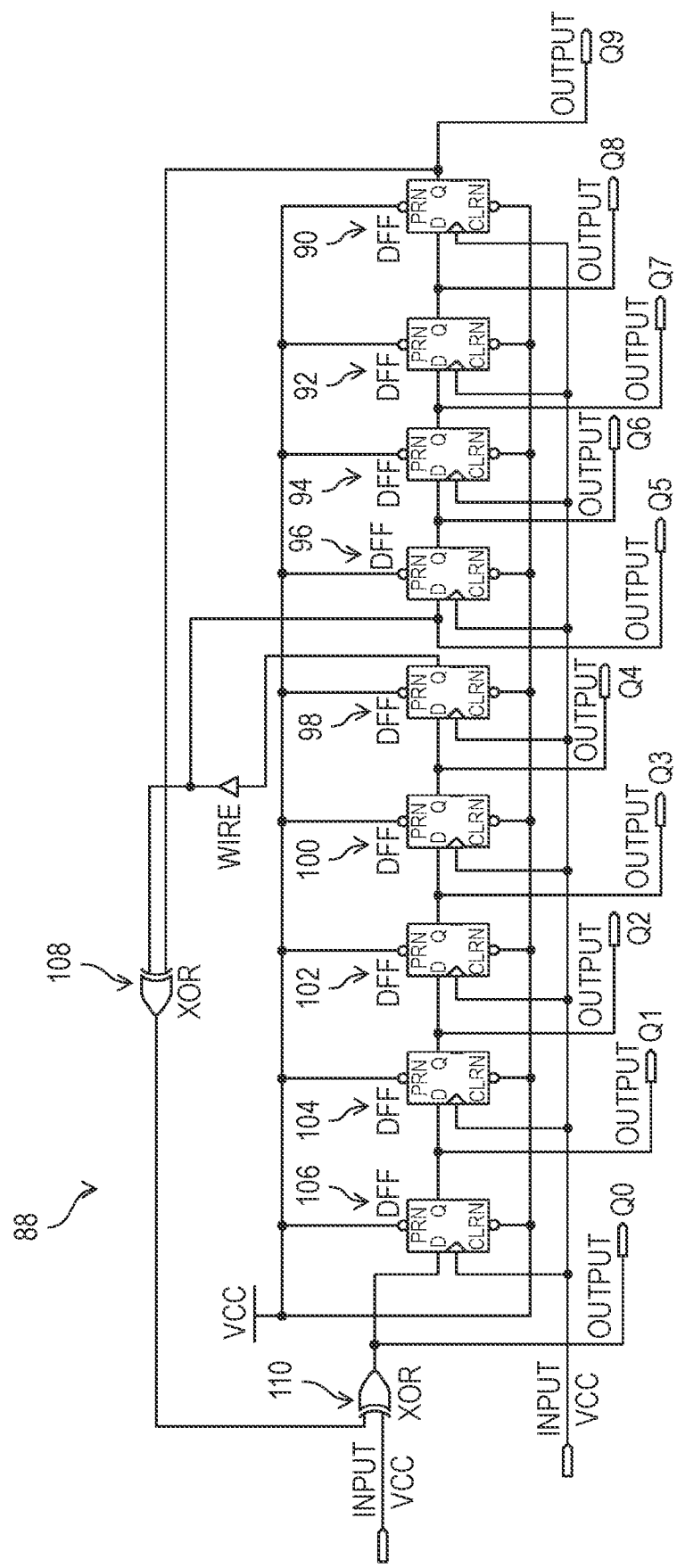
FIG. 14 is a diagram illustrating a calculation circuit that calculates values for forming a first pattern different from the first pattern of the encoder shown in FIG. 1.

FIG. 14 is a diagram illustrating calculation circuit 88 that calculates values for forming the first pattern different from first pattern 24 of encoder 10 shown in FIG. 1. FIG. 15 is a table illustrating values obtained by calculation circuit 88 in FIG. 14.

Calculation circuit 88 illustrated in FIG. 14 is a circuit for calculating a value based on an M code (irreducible polynomial): $X^9+X^5+1$. It is possible to form the first pattern including a first arrangement and a second arrangement, which is different from first pattern 24, by forming the first pattern based on the values obtained by calculation circuit 88.

As illustrated in FIG. 14, calculation circuit 88 includes plural registers 90 to 106 and plural XOR circuits 108 and 110.

A value output from register 90 is input to XOR circuit 108. A value output from register 92 is input to register 90. A value output from register 94 is input to register 92. A value output from register 96 is input to register 94. A value output from register 98 is input to XOR circuit 108 and register 96. A value output from register 100 is input to register 98. A value output from register 102 is input to register 100. A value output from register 104 is input to register 102. A value output from register 106 is input to register 104.

The value output from register 90 and the value output from register 98 are input to XOR circuit 108, and XOR circuit 108 calculates an exclusive logical sum of these two values and outputs the calculated value. A predetermined value input from the outside and the value output from XOR circuit 108 are input to XOR circuit 110, and XOR circuit 110 calculates an exclusive logical sum of these two values and outputs the calculated value.

For example, the predetermined value is one value previously determined. The value output from XOR circuit 110 is input to register 106.

For example, when registers 90, 94, 98, and 102 previously store value "0" and registers 92, 96, 100, 104, and 106 previously store "1", values illustrated in FIG. 15 are obtained by repeating calculation and output of an exclusive logical summation.

By using the values illustrated in FIG. 15, it is possible to form a first pattern including a first arrangement that is an arrangement of nine unit regions, a second arrangement that is an arrangement of four unit regions, and a third arrangement that is an arrangement of one unit region and is for outputting correction information for correcting position information obtained based on the first arrangement. The third arrangement is adjacent to the first arrangement and opposite to the second arrangement with respect to the first arrangement.

For example, an output value output based on a head unit region in the second arrangement is a value obtained by taking an exclusive local sum of two output values output based on a head unit region and a fifth unit region from the head of the first arrangement. An output value output based on a fourth unit region from the head of the second arrangement is a value obtained by taking an exclusive logical sum of two output values output based on a fourth unit region and an eighth unit region from the head of the first arrangement. An output value output based on a ninth unit region from the head of the first arrangement is a value obtained by taking an exclusive logical sum of two output values output based on a head unit region in the third arrangement and the fourth unit region from the head of the first arrangement. Since such a relation is established, the position information obtained based on the first arrangement is corrected using correction information obtained based on the second arrangement and correction information obtained based on the third arrangement.

Other Embodiments

As described above, the embodiment is described as an example of the technique disclosed in the present application. However, the technique according to the present disclosure is not limited thereto, and can be applied to embodiments or modified examples in which changes, substitutions, additions, omissions, and the like are appropriately performed without departing from the gist of the present disclosure.

In the embodiment described above, a case in which encoder 10 includes first pattern 24 and second pattern 26 is described, and the present disclosure is not limited thereto. For example, encoder 10 may not include second pattern 26.

In this case, an encoder includes rotatable plate 12 including first pattern 24, light emission unit 18 configured to emit light to first pattern 24, and light receiving unit 20 configured to receive the light emitted from light emission unit 18 and passing through first pattern 24. First pattern 24 includes first unit regions 32 and second unit regions 34 which are arranged in a circumferential direction about a rotation axis A of rotatable plate 12. Each first unit regions 32 is configured to guide the light emitted from light emission unit 18 to light receiving unit 20. Each second unit regions 34 is configured not to guide the light emitted from light emission unit 18 to light receiving unit 20. When first unit regions 32 and second unit regions 34 are referred to as unit regions, first pattern 24 includes a first arrangement that is an arrangement of nine unit regions for outputting position information indicating a position of rotation shaft 5, and a second arrangement adjacent to the first arrangement. The second arrangement is an arrangement of two unit regions for outputting correction information for correcting the position information.

Accordingly, first pattern 24 includes the second arrangement that is the arrangement of two unit regions for outputting the correction information for correcting the position information. Therefore, when the first arrangement does not normally guide the light from light emission unit 18 to light receiving unit 20 and the position information is erroneous, it is possible to correct the position information using the correction information and to prevent a decrease in detection accuracy.

In the embodiment described above, a case in which the detection target by encoder 10 is rotation shaft 5 is described, and the present disclosure is not limited thereto. For example, the detection target by encoder 10 may not be rotation shaft 5, and may be a rotating body that rotates.

In the embodiment described above, a case in which first unit region 32 and first unit region 40 transmit the light emitted from light emission unit 18 and guide the light to light receiving unit 20 is described, and the present disclosure is not limited thereto. For example, the first unit region may reflect the light emitted from the light emission unit and guide the light to the light receiving unit. In this case, for example, the main body of the rotatable plate is made of SUS or the like, the first unit region is formed by chromium plating or the like that reflects light, and the second unit region is formed by black chromium plating or the like that does not reflect light.

In the embodiment described above, a case in which second pattern 26 is provided radially inward of first pattern 24 is described, and the present disclosure is not limited thereto. For example, the second pattern may be provided radially outward of the first pattern.

In the embodiment described above, a case in which first unit region 32 and second unit region 42 corresponding to first unit region 32 are adjacent to each other in the radial direction is described, and the present disclosure is not limited thereto. For example, first unit region 32 and second unit region 42 corresponding to first unit region 32 may not be adjacent to each other in the radial direction, and may be provided at positions deviated in radial directions.

In the embodiment described above, a case in which second unit region 34 and first unit region 40 corresponding to second unit region 34 are adjacent to each other in the radial direction is described, and the present disclosure is not limited thereto. For example, second unit region 34 and first unit region 40 corresponding to second unit region 34 may not be adjacent to each other in the radial direction, and may be provided at positions deviated in radial directions.

In the embodiment described above, a case in which first pattern 24 and second pattern 26 are provided on the main surface of main body 22 directed to the first substrate 14 is described, and the present disclosure is not limited thereto. For example, the first pattern and the second pattern may be formed such that the main body of the rotatable plate is made of a material that does not transmit light, and the first unit region is formed by a through hole that passes through the main body of the rotatable plate. In this case, a part of the main body of the rotatable plate functions as the second unit region.

In the embodiment described above, a case in which the first arrangement is an arrangement of nine unit regions, the second arrangement is an arrangement of two or four unit regions, and the third arrangement is an arrangement of one unit region is described, and the present disclosure is not limited thereto.

INDUSTRIAL APPLICABILITY

An encoder according to the present disclosure may be used for rotation detection of a rotation shaft or the like of a motor that rotationally drives a load.

REFERENCE MARKS IN THE DRAWINGS 10 encoder
12 rotatable plate
14 first substrate
16 second substrate
18 light emission unit
20 light receiving unit
22 main body
24 first pattern
26 second pattern
28 first light-guidable portion
30 first non-light-guidable portion
32, 40 first unit region
34, 42 second unit region
36 second light-guidable portion
38 second non-light-guidable portion
44 first light emitter
46 second light emitter
48 first light receiving element
50 second light receiving element
52 determination unit
54 correction unit

The invention claimed is:

1. An encoder comprising:
a rotatable plate configured to rotate in a rotation direction about a rotation axis, the rotatable plate including a first pattern and a second pattern, which are formed based on an M code;
a light emission unit configured to emit light to the first pattern and the second pattern; and
a light receiving unit configured to receive light emitted from the light emission unit and passing through the first pattern and light emitted from the light emission unit and passing through the second pattern, wherein:
each of the first pattern and the second pattern includes first unit regions and second unit regions which are arranged in a circumferential direction about the rotation axis of the rotatable plate, the first unit regions being configured to guide the light emitted from the light emission unit to the light receiving unit, the second unit regions being configured not to guide the light emitted from the light emission unit to the light receiving unit, and the first unit regions and the second unit regions of the first pattern are reverse to the first unit regions and the second unit regions of the second pattern in a direction perpendicular to the rotation direction.

2. The encoder of claim 1, further comprising a determination unit, wherein the light receiving unit includes:
  a first light receiving element configured to receive the light emitted from the light emission unit and passing through the first pattern, binarize an intensity of the received light, and output the binarized intensity; and
  a second light receiving element configured to receive the light emitted from the light emission unit and passing through the second pattern, binarize an intensity of the received light, and output the binarized intensity, the second pattern is provided such that an output value of the second light receiving element is a value reversed to an output value of the first light receiving element, and when the output value of the second light receiving element is not the value reversed to the output value of the first light receiving element, the determination unit is configured to determine that one of the output value of the first light receiving element and the output value of the second light receiving element is erroneous, and outputs a determination result.

3. The encoder of claim 2, further comprising a correction unit, wherein when the first unit regions and the second unit regions are referred to as unit regions, the first pattern includes:
  one or more first arrangements, each of one or more first arrangements being an arrangement of M unit regions for outputting position information indicating a position of a unit region of a detection target; and
  one or more second arrangements, each of the one or more second arrangements being an arrangement of N unit regions, the each of one or more second arrangements being adjacent to respective one of the one or more first arrangements, and when the determination unit determines that one of the output value of the first light receiving element and the output value of the second light receiving element is erroneous, the correction unit is configured to correct the position information based on the one or more second arrangements.

4. The encoder of claim 3, wherein the first pattern includes a plurality of first arrangements comprising one or more first arrangements and a plurality of the second arrangements comprising one or more second arrangements, the plurality of the second arrangements corresponding to the plurality of first arrangements.

5. The encoder of claim 2, wherein when the first unit regions and the second unit regions are referred to as unit regions, each of the first pattern and the second pattern includes:
  a first arrangement being an arrangement of M unit regions; and
  a second arrangement being an arrangement of N unit regions, the first arrangement provides position information, and the second arrangement provides correction information for correcting the position information corresponding to the first arrangement.

6. The encoder of claim 5, further comprising a correction unit, wherein the correction unit is configured, based on a determination result of the determination unit:
  not to correct the position information and output the position information when the determination unit determines that the position information in correct; and
  to correct the position information and output the corrected position information when the determination unit determines that the position information in not correct.

7. The encoder of claim 1, wherein when the first unit regions and the second unit regions are referred to as unit regions, the first pattern includes:
  one or more first arrangements, each of the one or more first arrangements being an arrangement of M unit regions for outputting position information indicating a position of a unit region of a detection target; and
  one or more second arrangements, each of the one or more second arrangements being an arrangement of N unit regions adjacent to the first arrangement for outputting correction information for correcting the position information, the one or more second arrangements being adjacent to respective one of the one or more first arrangements.

8. The encoder of claim 7, wherein the first pattern includes a plurality of first arrangements comprising one or more first arrangements and a plurality of the second arrangements comprising one or more second arrangements, the plurality of the second arrangements corresponding to the plurality of first arrangements.

9. An encoder comprising:

a rotatable plate including a pattern;

a light emission unit configured to emit light to the pattern;

a light receiving unit configured to receive light emitted from the light emission unit and passing through the pattern; and a determination unit, wherein:

each of the first pattern and the second pattern includes first unit regions and second unit regions which are arranged in a circumferential direction about the rotation axis of the rotatable plate, the first unit regions being configured to guide the light emitted from the light emission unit to the light receiving unit, the second unit regions being configured not to guide the light emitted from the light emission unit to the light receiving unit, the first unit regions and the second unit regions of the first pattern are reverse to the first unit regions and the second unit regions of the second pattern in a direction perpendicular to the rotation direction, the light receiving unit includes:
  a first light receiving element configured to receive the light emitted from the light emission unit and passing through the first pattern, binarize an intensity of the received light, and output the binarized intensity; and
  a second light receiving element configured to receive the light emitted from the light emission unit and passing through the second pattern, binarize an intensity of the received light, and output the binarized intensity, the second pattern is provided such that an output value of the second light receiving element is a value reversed to an output value of the first light receiving element, and when the output value of the second light receiving element is not the value reversed to the output value of the first light receiving element, the determination unit is configured to determine that one of the output value of the first light receiving element and the output value of the second light receiving element is erroneous, and outputs a determination result.

10. The encoder of claim 9, further comprising a correction unit, wherein when the first unit regions and the second unit regions are referred to as unit regions, the first pattern includes:

one or more first arrangements, each of one or more first arrangements being an arrangement of M unit regions for outputting position information indicating a position of a unit region of a detection target; and one or more second arrangements, each of the one or more second arrangements being an arrangement of N unit regions, the each of one or more second arrangements being adjacent to respective one of the one or more first arrangements, and when the determination unit determines that one of the output value of the first light receiving element and the output value of the second light receiving element is erroneous, the correction unit is configured to correct the position information based on the one or more second arrangements.

11. The encoder of claim 10, wherein the first pattern includes a plurality of first arrangements comprising one or more first arrangements and a plurality of the second arrangements comprising one or more second arrangements, the plurality of the second arrangements corresponding to the plurality of first arrangements.

12. An encoder comprising:

a rotatable plate configured to rotate in a rotation direction about a rotation axis, the rotatable plate including a first pattern and a second pattern;

a light emission unit configured to emit light to the first pattern and the second pattern; and a light receiving unit configured to receive light emitted from the light emission unit and passing through the first pattern and light emitted from the light emission unit and passing through the second pattern, wherein:

each of the first pattern and the second pattern includes first unit regions and second unit regions which are arranged in a circumferential direction about the rotation axis of the rotatable plate, the first unit regions being configured to guide the light emitted from the light emission unit to the light receiving unit, the second unit regions being configured not to guide the light emitted from the light emission unit to the light receiving unit, the first unit regions and the second unit regions of the first pattern are reverse to the first unit regions and the second unit regions of the second pattern in a direction perpendicular to the rotation direction, and when the first unit regions and the second unit regions are referred to as unit regions, the first pattern includes:

one or more first arrangements, each of the one or more first arrangements being an arrangement of M unit regions for outputting position information indicating a position of a unit region of a detection target; and one or more second arrangements, each of the one or more second arrangements being an arrangement of N unit regions adjacent to the first arrangement for outputting correction information for correcting the position information, the one or more second arrangements being adjacent to respective one of the one or more first arrangements.

13. The encoder of claim 12, wherein the first pattern includes a plurality of first arrangements comprising one or more first arrangements and a plurality of the second arrangements comprising one or more second arrangements, the plurality of the second arrangements corresponding to the plurality of first arrangements.

* * * * *